(12) United States Patent
Seider

(10) Patent No.: US 10,098,195 B2
(45) Date of Patent: Oct. 9, 2018

(54) CIRCUIT ARRANGEMENT FOR OPERATING AT LEAST A FIRST AND A SECOND CASCADE OF LEDS

(71) Applicant: OSRAM GmbH, Munich (DE)

(72) Inventor: Andreas Seider, Obertaufkirchen (DE)

(73) Assignee: OSRAM GmbH, Munich (DE)

( * ) Notice: Subject to any disclaimer, the term of this patent is extended or adjusted under 35 U.S.C. 154(b) by 2 days.

(21) Appl. No.: 15/512,073

(22) PCT Filed: Sep. 10, 2015

(86) PCT No.: PCT/EP2015/070716
§ 371 (c)(1),
(2) Date: Mar. 17, 2017

(87) PCT Pub. No.: WO2016/041840
PCT Pub. Date: Mar. 24, 2016

(65) Prior Publication Data
US 2017/0257919 A1   Sep. 7, 2017

(30) Foreign Application Priority Data

Sep. 17, 2014 (DE) ........................ 10 2014 218 687

(51) Int. Cl.
*H05B 37/00* (2006.01)
*H05B 33/08* (2006.01)

(52) U.S. Cl.
CPC ....... *H05B 33/0827* (2013.01); *H05B 33/089* (2013.01); *H05B 33/0815* (2013.01); *H05B 33/0824* (2013.01)

(58) Field of Classification Search
CPC ............ H05B 33/0809; H05B 33/0812; H05B 33/0815; H05B 33/0824; H05B 33/083; H05B 33/0836; H05B 33/089

(Continued)

(56) References Cited

U.S. PATENT DOCUMENTS 9,609,709 B2 *  3/2017 Keller .................. H05B 33/083
2010/0060175 A1  3/2010 Lethellier
(Continued)

FOREIGN PATENT DOCUMENTS

DE    202013000064 U1    1/2013
DE    102012000605 A1    5/2013
(Continued)

OTHER PUBLICATIONS

German Search Report based on application No. 10 2014 218 687.0 (7 pages) dated May 4, 2015 (for reference purpose only).

(Continued)

*Primary Examiner* — Tung X Le
(74) *Attorney, Agent, or Firm* — Viering, Jentschura & Partner mbB

(57) ABSTRACT

A circuit arrangement for operating at least a first and a second cascade of LEDs is provided including an input having a first and a second input connection for coupling to a rectified AC supply voltage, a voltage equalization series impedance, and at least a higher and a lower LED units which include cascades. The connection of the LED cascade that is not coupled to a first diode is a second node, and the second node of the lowest LED unit is coupled to a voltage equalization series impedance such that the impedance is coupled in series between the second node and the second input connection. In not-the-lowest LED unit, a fourth node is at any rate a node of the circuit arrangement that is at a lower potential, at least during a prescribable period during the circuit arrangement operation, than the second node.

17 Claims, 15 Drawing Sheets

(58) Field of Classification Search
USPC .............................. 315/185 R, 186, 192, 193
See application file for complete search history.

(56) References Cited

U.S. PATENT DOCUMENTS

| | | | | |
|---|---|---|---|---|
| 2012/0146519 | A1* | 6/2012 | Briggs ............... | H05B 33/0818 315/192 |
| 2013/0106291 | A1 | 5/2013 | Tran | |
| 2013/0278151 | A1* | 10/2013 | Lear ................... | H05B 33/0815 315/164 |
| 2013/0293129 | A1 | 11/2013 | Seider | |
| 2014/0070704 | A1 | 3/2014 | Maiwald | |
| 2014/0159603 | A1* | 6/2014 | Lee .................... | H05B 33/0824 315/200 R |
| 2014/0191676 | A1 | 7/2014 | Seider et al. | |
| 2014/0210351 | A1 | 7/2014 | Yu et al. | |
| 2014/0300278 | A1* | 10/2014 | Van Bodegraven ......................... | H05B 33/0827 315/153 |

FOREIGN PATENT DOCUMENTS

| | | |
|---|---|---|
| DE | 102012006315 A1 | 10/2013 |
| DE | 102012207457 A1 | 11/2013 |
| DE | 102013201439 A1 | 11/2013 |
| DE | 102012215933 A1 | 3/2014 |
| WO | 2012034102 A1 | 3/2012 |

OTHER PUBLICATIONS

International Search Report based on application No. PCT/EP2015/070716 (9 pages) dated Nov. 19, 2015 (for reference purpose only).

\* cited by examiner

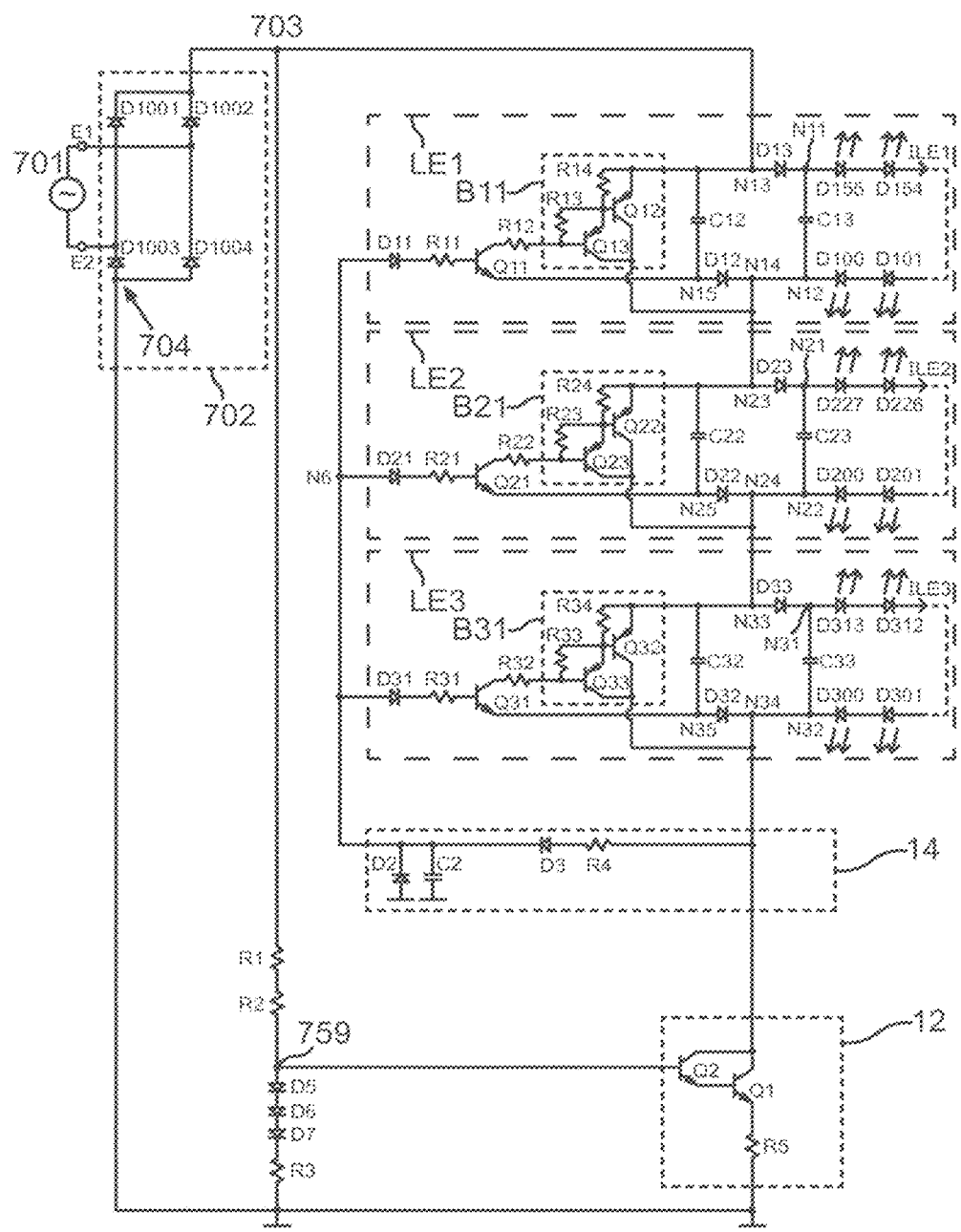
Fig.1a (SdT)

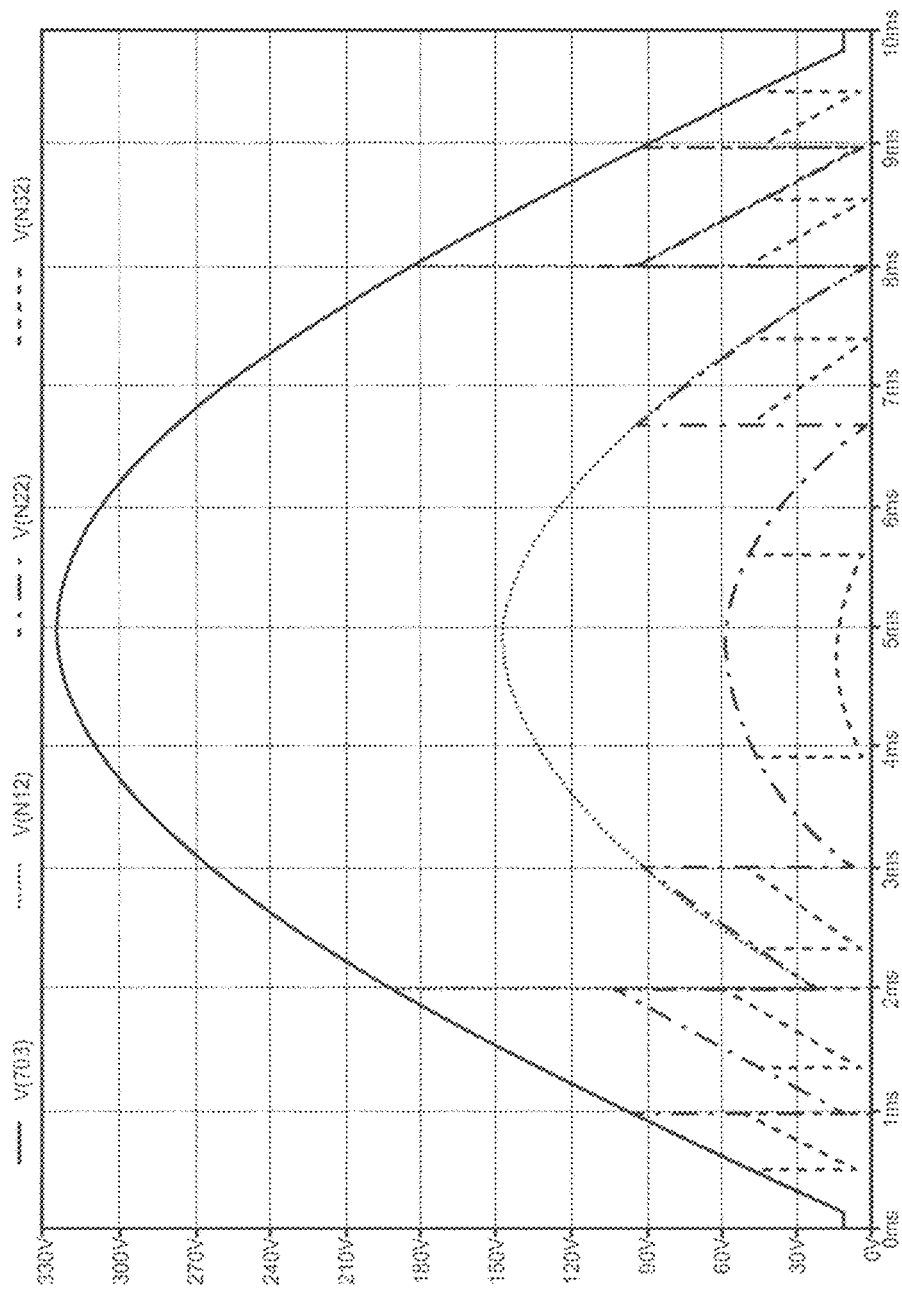

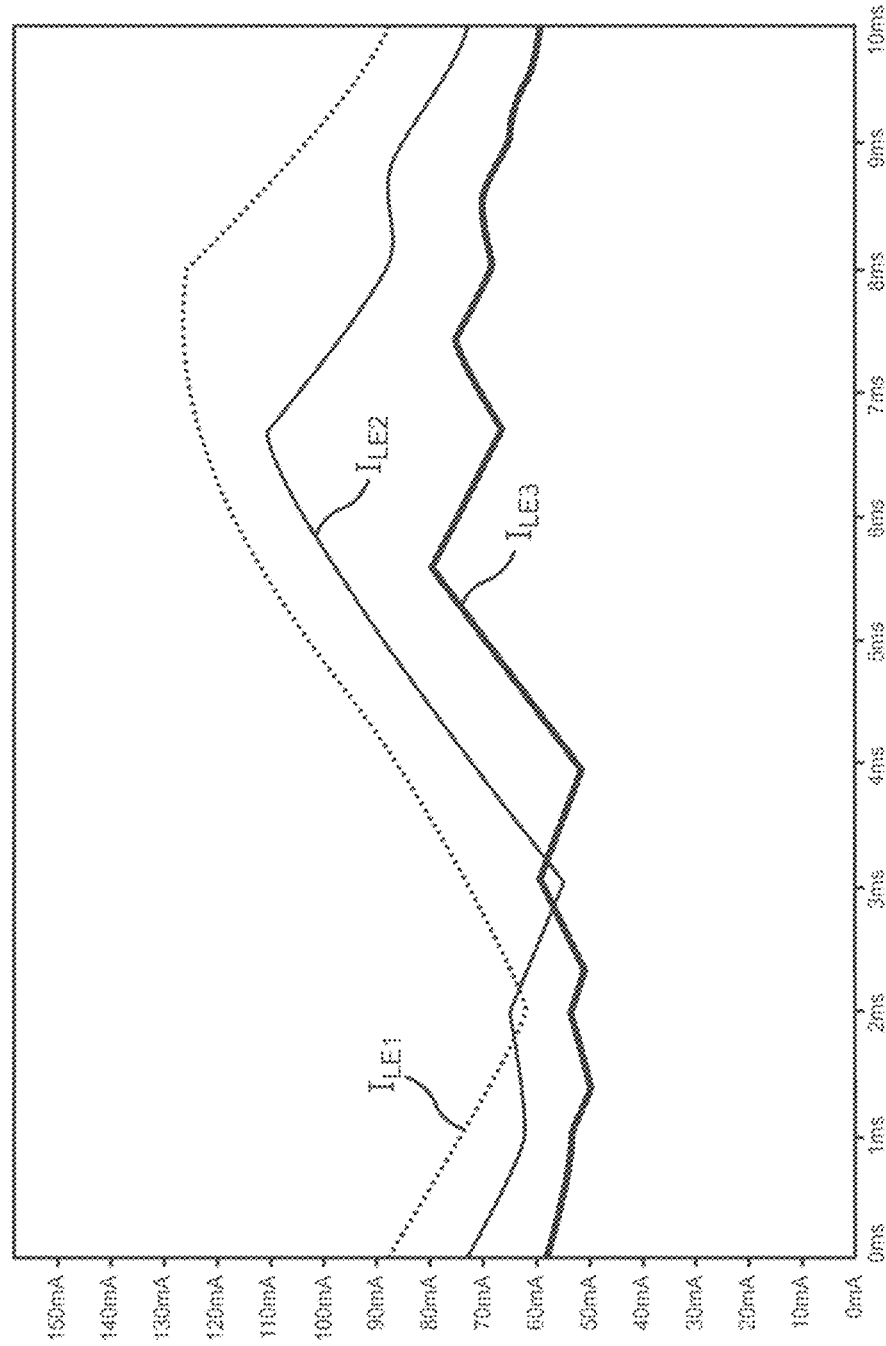

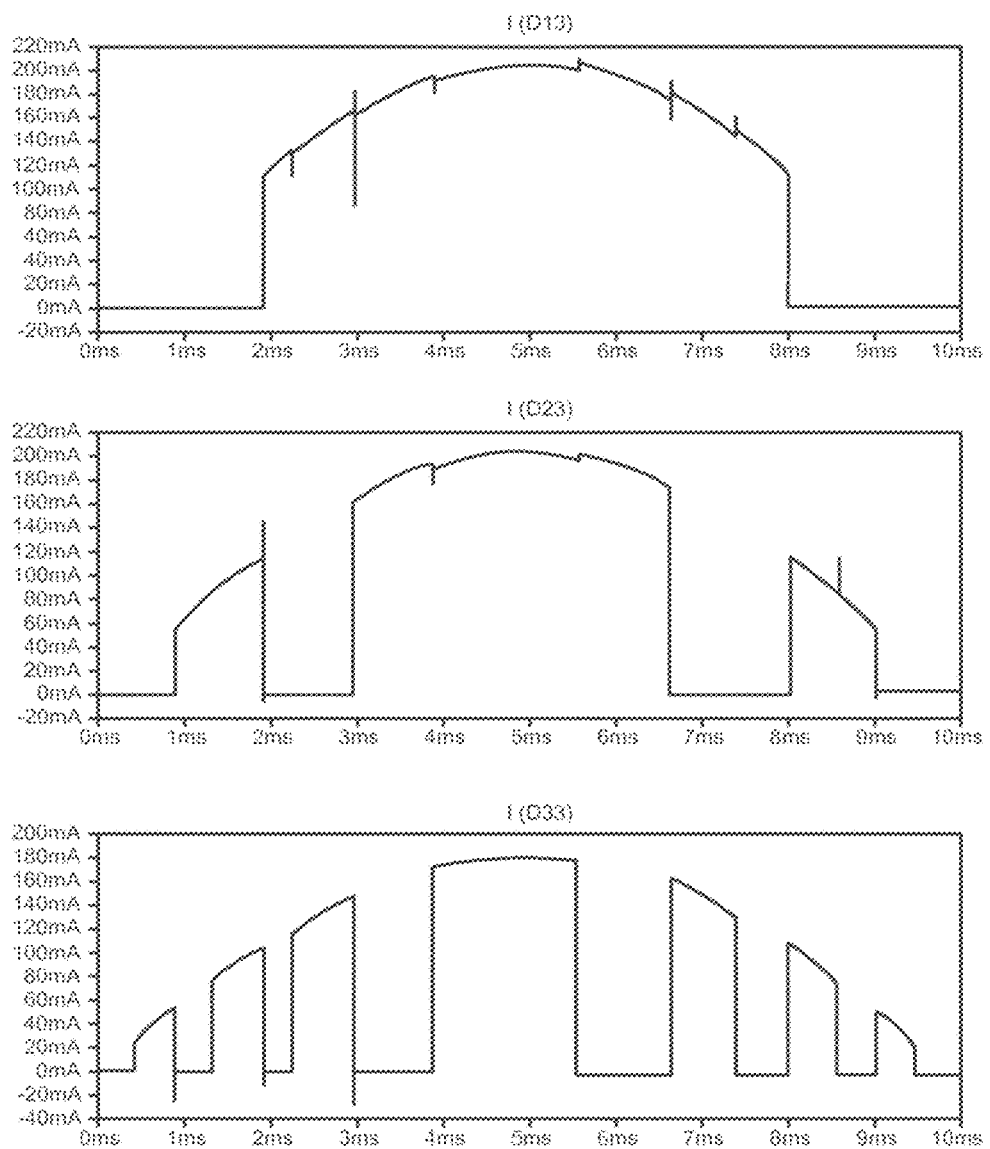
Fig.1d(SdT)

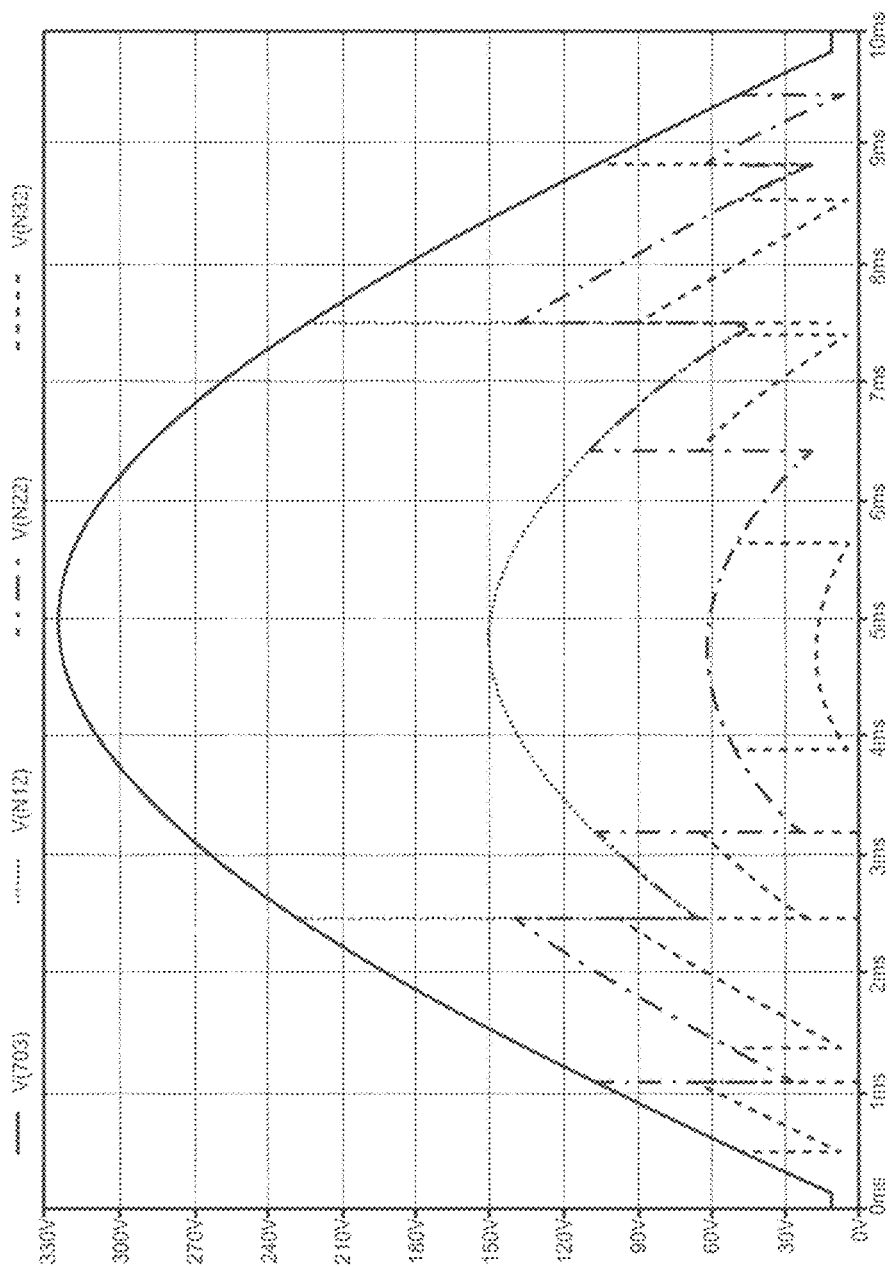

CIRCUIT ARRANGEMENT FOR OPERATING AT LEAST A FIRST AND A SECOND CASCADE OF LEDS

RELATED APPLICATIONS

The present application is a national stage entry according to 35 U.S.C. § 371 of PCT application No.: PCT/EP2015/070716 filed on Sep. 10, 2015, which claims priority from German application No.: 10 2014 218 687.0 filed on Sep. 17, 2014, and is incorporated herein by reference in its entirety.

TECHNICAL FIELD

The present disclosure relates to a circuit arrangement for operating at least a first and a second cascade of LEDs including an input having a first and a second input connection for coupling to a rectified AC supply voltage, a voltage equalization series impedance, and also at least a first, higher and a second, lower LED unit, wherein the first LED unit includes the first cascade of LEDs and the second LED unit includes the second cascade of LEDs. In this case, each LED unit additionally includes a first diode that is coupled in series with the respective LED cascade, wherein the coupling point between the first diode and the respective LED cascade is a first node, wherein that connection of the LED cascade that is not coupled to the first diode is a second node, wherein that connection of the first diode that is not coupled to the LED cascade is a third node. Each LED unit additionally includes the series connection of a first capacitor and a second diode, which is coupled between the third node and a fourth node of the circuit arrangement, wherein the coupling point between the first capacitor and the second diode is a fifth node, the anode of the second diode being coupled to the fifth node. Finally, each LED unit includes a first and a second electronic switch each having a control electrode, a reference-ground electrode and a main electrode, wherein the control electrode of the first electronic switch is coupled to a sixth node, wherein the reference-ground electrode of the first electronic switch is coupled to the fifth node, wherein the main electrode of the first electronic switch is coupled to the control electrode of the second electronic switch, wherein the reference-ground electrode of the second electronic switch is coupled to the third node, wherein the main electrode of the second electronic switch is coupled to the second node. The third node of the highest LED unit is coupled to the first input connection, the second node of the lowest LED unit being coupled to the voltage equalization series impedance such that the voltage equalization series impedance is coupled in series between the second node of the lowest LED unit and the second input connection. The third node of a respective LED unit that is not the highest LED unit is coupled to the second node of the next highest LED unit. The sixth nodes of all LED units are coupled to a DC voltage source.

BACKGROUND

Such a circuit arrangement is known from DE 10 2013 201 439 A1 and is depicted by way of example in FIG. 1a. In this connection, DE 10 2012 215 933 A1 additionally discloses an electronic ballast for operating at least one first unit, which includes a first cascade of LEDs and a first storage capacitor connected in parallel therewith, and at least one second unit, which includes at least a second cascade of LEDs and a second storage capacitor connected in parallel therewith. The at least one second unit moreover includes a diode that is coupled in series with the parallel circuit including the second cascade of LEDs and the second storage capacitor. The at least one second unit has an actuating element connected in parallel with it that can be operated in the on state, in the off state or linearly. A corresponding actuating element is also arranged in series with the series connection of the first and at least one second unit. A current controller can be used to actuate the actuating elements, the setpoint value being provided in proportion to the time profile of the AC supply voltage.

WO 2012/034102 A1 discloses a system for directly actuating light emitting diodes (LEDs). A chain of LEDs is coupled via an input voltage and has a plurality of separate groups of LEDs. Each of a plurality of switches is coupled in parallel with an associated group of the groups of LEDs for controlling the flow of current through the associated group of LEDs on the basis of a control signal from a control circuit. A switch protection circuit is connected to at least one of the switches. The switch protection circuit is designed to put the switch into an on state in the event of failure of an LED in the associated group of LEDs.

Moreover, the further sphere of DE 10 2012 006 315 A1 proposes an LED lighting device adapted for an AC power supply, having multiple LEDs that form an overall chain, the LEDs being distributed in LED subgroups. There is a supply voltage having alternating amplitude in the LED lighting apparatus, wherein at least two LED subgroups are interconnected in parallel with one another in a lower circuit state of the overall chain and wherein the overall chain has a first on-state voltage in the lower circuit state. A circuit device is designed to interconnect the at least two LED subgroups in series with one another in a higher circuit state, the overall chain having a second on-state voltage, which is higher than the first on-state voltage, in the higher circuit state. In comparison with a circuit arrangement of the type in question, however, increased complexity in terms of circuitry can be noted for a circuit device for selective series/parallel interconnection. Moreover, LED subgroups that are to be connected in parallel must have a matching forward voltage.

In a broader sphere, US 2010/0060175 A1 discloses an apparatus, a method and a system for supplying power to a load, such as a multiplicity of light emitting diodes, for example. An exemplary apparatus has a primary component, a first secondary component couplable to a first load and a second secondary component couplable to a second load. The primary component includes a transformer having a transformer primary winding. The first secondary component includes a first transformer secondary winding, which is magnetically coupled to the transformer primary winding, and the second secondary component includes a second transformer secondary winding, which is magnetically coupled to the transformer primary winding, the second secondary component being couplable in series with the first secondary component by the first or the second load. When it is supplied with power by a current source, the first secondary component has a first polarity of the voltage and is couplable in series with the first load, which is designed to have an opposite, second polarity of the voltage, the voltages essentially cancelling one another out in order to provide a comparatively low resultant voltage level. Unlike in the case of a circuit arrangement of the type in question, the light emitting diodes are not coupled directly, that is to say not DC coupled, in series between a rectified AC supply voltage, however, but rather are arranged in sections, in each case in alternation with a secondary component that is DC isolated from the primary component. This results in greater complexity for the distributed supply of power by the secondary components and the DC isolation by means of a transformer.

In the case of the circuit arrangement depicted schematically in FIG. 1a, a mains AC voltage 701 is connected to two nodes 703 and 704 via a rectifier 702. The node 703 is connected to a node 759 via the series connection of two resistors R1 and R2. The node 759 is coupled to the node 704 via the series connection of three diodes D5, D6, D7 and a nonreactive resistor R3, the cathodes of the diodes D5, D6, D7 pointing in the direction of the node 704. The nonreactive resistors R1, R2, the diodes D5, D6 and D7 and the nonreactive resistor R3 form a voltage divider whose tap is the node 759. The circuit arrangement additionally includes a voltage equalization series impedance 12, which in the present case is embodied as a linear controller that includes two NPN transistors Q1, Q2 in a Darlington arrangement and a nonreactive resistor R5 that is coupled in series with said Darlington stage Q1, Q2. The base of the transistor Q2 is the control connection of the linear controller 12 and is coupled to the node 759. The ratio R3:R5 sets the ratio by which the current through the Darlington stage is larger than the smaller current through the voltage divider including R1, R2, D5, D6, D7 and R3. Hence, the Darlington current is proportional to the voltage between the nodes 703 and 704, as a result of which the current flowing through the whole circuit turns out to be essentially proportional to the mains AC voltage 701. The voltage equalization series impedance 12 could also be embodied as what is known as a constant current source or, in the simplest case, even as an inductance or as a nonreactive resistor, in which case it is possible to dispense with the voltage divider including R1, R2, D5, D6, D7 and R3.

Coupled between the nodes 703 and 704 is a series connection of, in the present case, three LED units LE1, LE2, LE3 and the voltage equalization series impedance 12. The design of an LED unit is depicted below using the example of the LED unit LE3, the design of the LED units LE1, LE2 being essentially identical, differing only in the number of respective LEDs and the resultant dimensioning of the components.

The LED unit LE3 includes the LEDs D300 to D313, accordingly fourteen LEDs, which are connected in series with one another and form an LED cascade. Coupled in series with the LED cascade is a diode D33, the coupling point between the diode D33 and the LED cascade being a first node N31, to which the cathode of the diode D33 is connected. That connection of the LED cascade that is not coupled to the diode D33 is a second node N32, which can subsequently also be referred to as the "output of the LED unit" or "output node of the LED unit". That connection of the diode D33 that is not coupled to the LED cascade, that is to say the anode of said diode, is a third node N33, which can subsequently also be referred to as the "input of the LED unit" or "input node of the LED unit". Coupled in parallel with the LED cascade, there may be an optional capacitor C33, which can also be referred to as a buffer capacitor. Coupled between the node N33 and a fourth node N34 is the series connection of a capacitor C32 and a diode D32, the coupling point between the capacitor C32 and the diode D32 being a fifth node N35, to which the anode of the diode D32 is connected. In the present case, the second and fourth nodes N32 and N34 are identical.

The LED unit LE3 additionally includes two electronic switches Q31 and B31, wherein the control electrode of the switch Q31 is coupled to a node N6 via the series connection of a diode D31 and a nonreactive resistor R31. The reference-ground electrode of this switch Q31 is coupled to the node N35, while its main electrode is coupled to the control electrode of the switch B31 via a nonreactive resistor R32. The reference-ground electrode of the switch B31 is coupled to the node N33, while its main electrode is coupled to the node N32: the output side of the switch B31 between its main and reference-ground electrodes corresponds exactly to the path between the input and output nodes of the associated LED unit. Coupled to the output of a higher than the lowest LED unit there is always the input of the LED unit situated directly beneath, to the output of the lowest LED unit the voltage equalization series impedance, and finally to the input of the highest LED unit the node 703.

In the present embodiment, the switch B31 is implemented as a Darlington stage and includes the transistors Q32 and Q33 and also the nonreactive resistors R33 and R34. Instead of the Darlington stage, however, a single transistor may, in particular, also be provided.

The LED units LE2, LE1 are of comparable design, but each include a different number of LEDs. It goes without saying that further LED units may be provided furthermore. In the present case, the LED unit LE2 includes the LEDs D200 to D227, i.e. 28 LEDs, and the LED unit LE1 includes the LEDs D100 to D155, that is to say 56 LEDs. As can clearly be seen, the number of LEDs doubles from LED unit to LED unit starting from the lowest LED unit LE3 up to the highest LED unit LE1.

The second node of the lowest LED unit LE3, in the present case the node N32 (or N34), is coupled to the main electrode of the voltage equalization series impedance 12 acting as a linear controller, while the third node N13 of the highest LED unit LE1 is coupled to the node 703. Coupled between the node N6 and the node 704 is a DC voltage source 14, which is discussed in more detail further below.

By way of example, the circuit arrangement depicted in FIG. 1a has the following components and dimensions: R1=75 kΩ, R2=500Ω, R3=2.5 kΩ, R5=10Ω, R11=200 kΩ, R21=100 kΩ, R31=50 kΩ, R12=1 mΩ, R22=500 kΩ, R32=250 kΩ, R13=R23=R33=10 kΩ, R14=R24=R34=1 kΩ, C12=470 nF, C22=1 pF, C32=1 pF, C13=22 pF, C23=47 pF, C33=100 pF, R4=5 kΩ, C2=22 pF.

The capacitors C13, C23, C33 are of comparatively large design and serve as a buffer capacitor for the LEDs of the respective LED cascade. In this case, it is advantageous that these capacitors need to be designed only for the voltage dropped across the relevant LED cascade and hence not for the full level of the mains AC voltage 701. Accordingly, these capacitors may be embodied in a smaller form and hence in a more space saving manner.

The diodes D11, D21, D31 are optional and can be eliminated if the transistors Q11, Q21, Q31 are designed to have accordingly high electric strength.

Within the voltage divider, the diode D7 is optional, and the diodes D5 and D6 are used to compensate for the base/emitter voltage of the transistors Q1 and Q2. The voltage dropped across the nonreactive resistor R3 therefore substantially corresponds to the voltage dropped across the nonreactive resistor R5. The current through the resistor R5 is accordingly half-sinusoidal. It follows from this that the current through the circuit arrangement follows the input voltage, as a result of which a good power factor is obtained and low EMC interference.

The effect that can be achieved by the dimensioning of the circuit arrangement shown in FIG. 1a is that the switch B11 is operated at a switching frequency of approximately 100 Hz in one example. Flickering that is sometimes perceptible on account of this switching frequency is prevented by the associated buffer capacitor C13. The switch B21 operates at a switching frequency of approximately 200 Hz, for example, and the switch B31 operates at a switching frequency of approximately 400 Hz, for example.

The combination of the capacitor C12 and the diode D12 is a peak value detector for the LED unit LE1 including the LED cascade with the LEDs D100 to D155. Accordingly, the capacitor C22 and the diode D22 are a peak value detector for the LED unit LE2, and the capacitor C32 and the diode D32 are a peak value detector for the LED unit LE3.

The transistors Q11, Q21 and Q31 act as comparators. The manner of operation is described below using the lowest LED unit LE3 by way of example.

The resistor R32 is designed in combination with the capacitor C32 such that the capacitor C32 is discharged only little even during the longest switched-on phase that can be expected for the switch B31. The voltage source 14 prescribes a voltage offset as minimum voltage, for example at a level of 6V, which is meant to guarantee an adequate operating voltage for the voltage equalization series impedance 12. The transistor Q31 compares the voltage 6V with the voltage on the node N35. If the switch B31 is on, then the LEDs D300 to D313 and their series diode D33 are bypassed, but can still continue to be supplied with power from the buffer capacitor C33 in this phase. Nevertheless, the LED unit LE3 is shorted to the outside. Therefore, the node N35 has reduced the potential from N33 by the voltage across the capacitor C32, which corresponds to the forward voltage of the LEDs D300 to D313. In this phase, the diode D32 is not on. Only when the potential on the node N33, that is to say at the input of LE3, and hence also the voltage across the voltage equalization series impedance 12 becomes higher than the forward voltage of all LEDs that LE3 includes augmented by the voltage offset of the voltage source does the comparator Q31 become high impedance, for which reason the electronic switch B31 coupled thereto also switches off immediately. Buffered by the capacitor C32 and supported by the hard potential on the node N33, the potential on the node N35 remains unaffected by this switching-off process, and only D32 turns on and recharges the capacitor C32. The voltage between the nodes N33 and N32, however, changes abruptly to the forward voltage of the LEDs of the unit under consideration, for which reason the voltage across the voltage equalization series impedance 12 is likewise accordingly reduced abruptly. The point of the voltage offset is thus to ensure, even directly after such a switching-off process, that the voltage equalization series impedance 12 does not uncontrollably become high impedance and briefly switch off the whole system, which would also run counter to the logic just described. Each switching process of one of the second electronic switches B11, B21 or B31 shifts not only the operating point of the voltage equalization series impedance 12 but also the operating points of the remaining actuating units for the LED units currently not under consideration.

Concerning the manner of operation: the switching-on time is subsequently assumed to be the beginning of a half-cycle of the AC voltage source 701. Additionally, it is assumed that all switches of the LED units, i.e. the switches Q11, B11, Q21, B21, Q31, B31, are on and all capacitors are charged (steady state). The forward voltage of an LED is assumed to be 3V, and that of a diode and of a transistor base/emitter junction is assumed to be 0.7V in each case.

As a result of the switches that are on, the instantaneous output voltage from node 703 of the rectifier 702 is also applied to the node N32. The nodes N32 and N33 are at the same potential, since the switches Q31 and B31 have been assumed to be on. The voltage provided on the node N6 by the DC voltage source 14 is assumed to be 6V in the exemplary embodiment.

The capacitor C32 is affirmed to be charged to +42V at the beginning of the half-cycle from the previous cycle. These 42V are obtained from the forward voltages of the fourteen diodes D300 to D313, each forward voltage, as mentioned above, being assumed to be 3V. Hence, a potential of −42V is obtained at the node N35.

The potential of the node N6 is raised to 6V by the DC voltage source 14. This results in a flow of current through the diode D31, the resistor R31 and the transistor Q31. The transistor Q31 is on, since a current flows through its base, limited by R31 and driven by the voltage difference of approximately 48V arising from a potential of approximately 6V on the base and a potential of approximately −42V on its emitter. As a result of the transistor Q31 being on, the switch B31 is also on. The current accordingly flows past the LED cascade of the LED unit LE3, i.e. the LED cascade is shorted to the outside and currently not supplied with power. It can nevertheless be energized from the buffer capacitor C33. As agreed, the switches B21 and B11 are also on, which means that the LED cascades of the LED units LE1 and LE2 are likewise currently not supplied with power, that is to say are shorted to the outside. This situation is the starting point for a half-cycle of the rectified mains AC voltage 701.

In the further course of the half-cycle, the potential of the half-cycle rises. On account of the therefore increasing potential on the node 759, the voltage equalization series impedance 12 operating as a linear controller gradually begins to become conductive.

While the switches Q31 and B31 are on, the potential on the node N33 is equal to the potential on the node N32. In the further course of the half-cycle, the potential on the node N33 rises until the potential on the node N35 is approximately 4.6V (potential on the node N6 minus the forward voltage of the diode D31 minus $U_{BE}$ of Q31). As a result of 42V being stored in the capacitor C32, this is accordingly the case when the potential on the node N32 is 46.6V. At this time, the switches Q31 and B31 change to the off state, i.e. the potentials on the nodes N33 and N32 are decoupled. The potential on the node N33 remains at 46.6V, which still also corresponds to the potential of the node 703. The potential of the node N32 begins to fall on account of the conductivity of the voltage equalization series impedance 12 and the switching-off of the switch B31.

Since the voltage equalization series impedance 12, on the basis of appropriate actuation by the voltage divider, wants to maintain the flow of current through the nonreactive resistor R5 in line with what is prescribed by the voltage divider, it is made increasingly conductive, as a result of which the potential on the node N32 falls until the setpoint current has appeared. This is the case when the voltage on the node N32 has fallen to 3.9V. This value follows from the potential on the node N33, which, see above, is 46.6V after the switches Q31 and B31 have switched off, minus fourteen times the diode forward voltage of 3V, minus 0.7V to the forward voltage of the diode D33. This meets the requirement of the current flowing via the LED cascade of the LED unit LE3, for which reason this cascade lights up from this time onward (provided that the optional capacitor C33 is absent; if it is present, then its charge needs to be taken into consideration). In more general terms, the parallel circuit including the buffer capacitor C33 and the associated LED cascade is supplied with power from that point onward.

In the further course of the half-cycle, the voltage between the nodes 703 and 704 continues to rise, as a result of which the potential on the node N33 increases further accordingly. By means of the LEDs D300 to D313 that are on, the potential on the node N32 therefore also rises. The voltage difference between the potential on the node N33 and on the node N32 is 47.3V−4.6V=42.7V, or in simpler terms (14*3+0.7)V=42.7V. The capacitor C22 is charged to 28*3V=84V (the forward voltage of the 28 diodes D200 to D227).

If the rectified AC voltage rises to 60V, then these 60V are present on the node N23, since all switches Q11, B11 situated above the latter are on. The voltage on the node N25 is therefore 60V−84V=−24V. Since the voltage on the node N6 is constantly 6V, the switches Q21 and B21 are on, and the potentials of the nodes N22, N24, N33 are therefore coupled to that of N23 at low impedance. When the input voltage rises further, the potential on the node N23 and hence the potential on the node N24 increase. When the potential on the node N25 has reached 4.6V (potential on the node N6 minus the forward voltage of the diode D21 minus $U_{BE}$ of Q21), the switch Q21 and hence the switch B21 change to the off state. This is the case when the potential on the node N23 has reached 88.6V (4.6V on the node N33 plus 28 times 3V). From this time onward, the current begins to flow via the LED cascade D200 to D227 of the LED unit LE2, or the parallel circuit including LED cascade D200 to D227 and buffer capacitor C23 is supplied with power. At an input voltage of 88.6V, 28 times 3V plus 0.7V (the forward voltages of the 28 LEDs D200 to D227 and the forward voltage of the diode D23) are therefore dropped, as seen from the outside, across the LED unit LE2, so that the potential on the node N22 is now only 3.9V. Since the node N22 corresponds to the node N33, the potential on the node N33 therefore also is now just 3.9V. The potential on the node N35 is accordingly 3.9V−42.0V (in line with the potential on the node N33 minus the voltage stored in the capacitor C32)=−38.1V. Therefore, the voltage difference between the node N6 and the node N35 is −44.1V, as a result of which the transistor Q31 and hence the switch B31 turn on again. In this manner, the LED cascade D300 to D313 of the LED unit LE3 is shorted again from the outside, i.e. it is no longer supplied with power.

Accordingly, the LED cascades of the LED units LE2 and LE1 are supplied with power—the applicable switching phases are denoted by "1" in the table below—or shorted from the outside, which is denoted by "0" below.

| Switching process | LE1 | LE2 | LE3 |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |
| 9 | 1 | 1 | 1 |
| 10 | 1 | 1 | 0 |
| 11 | 1 | 0 | 1 |
| 12 | 1 | 0 | 0 |
| 13 | 0 | 1 | 1 |
| 14 | 0 | 1 | 0 |
| 15 | 0 | 0 | 1 |
| 16 | 0 | 0 | 0 |

The switching processes 1 and 9 from the table above are not genuine switching processes, as can be seen from the respective state equality of the switching processes 16 and 8. Rather, they depict important times for the rectified mains voltage applied to the input of the whole circuit: the transition from 16 to 1 denotes the minimum of the input voltage at the time of the mains zero crossing, at which no switching states change, but, on account of the abruptly changing rise, the logic does indeed. The same applies to the transition from 8 to 9, which describes the maximum of the input voltage. Thereafter, the reverse effect begins, i.e. the LED cascades of the LED units LE1, LE2 and LE3 are switched in succession, in precisely the reverse order, in line with the table above until, at a phase angle of 180°, all LED cascades are bypassed again (B11 to B31 on) and a new half-cycle begins. When the instantaneous supply voltage falls, the case frequently arises, for example, that a higher LED unit is bypassed and, as a result, the one directly beneath is subsequently supplied with power again.

To produce an auxiliary voltage for the node N6, the voltage drop across the voltage equalization series impedance 12, i.e. the voltage on the node N32, is used in the present case. On account of the binary design of the LED cascades, a sawtooth-like voltage becomes able to be tapped off therefrom, said voltage fluctuating between 3.9V (at every mains zero crossing 0V) and 46.6V until all LED cascades are connected. When all LED cascades are activated, that is to say during the above switching phases 8 and 9, a voltage is dropped across the voltage equalization series impedance 12, which voltage is obtained from the difference between the input voltage and the sum of the voltages dropped across the LED cascades and the sum of the forward voltages of the decoupling diodes. Since the voltage peaks in this sawtooth-like voltage are well distributed over time within a half-cycle, this sawtooth-like voltage can be used to produce an auxiliary voltage by means of an RC element R4, C2 and also a charging diode D3 and a zener diode D2 as voltage limiter. This auxiliary voltage has only low residual ripple, for which reason it is possible to use very small capacitances in comparison with other auxiliary power supplies. It is of very simple design and able to be produced in compact form, that is to say extremely inexpensive. Of particular advantage is the circumstance that, for the auxiliary power supply, a current is drawn that would otherwise be converted into power loss in the voltage equalization series impedance 12. Consequently, a parasitic power is used to produce the auxiliary voltage on the node N6. In this way, the auxiliary power supply produces no additional power loss, and the efficiency of the circuit arrangement is improved.

A disadvantage of the circuit arrangement depicted in FIG. 1a is the circumstance that it undesirably results in brighter and darker areas in a luminaire. In order to avoid impairing the appearance of an LED arrangement, DE 20 2013 000 064 U1 proposes, in this context, an LED arrangement having at least one first and a second LED chain, wherein the LEDs are arranged at least in part on at least one first arrangement area, and wherein the LEDs of the at least one first and second LED chain are arranged according to a prescribed criterion on the basis of their mean currents. A disadvantage of such an arrangement, however, is distinctly more complex conductor track routing, which can present difficulties particularly as regards compliance with the regulations concerning electromagnetic compatibility (EMC), and also low flexibility for adaptation to suit changed circuit parameters.

SUMMARY

The object of the present disclosure is therefore that of developing a circuit arrangement of the type cited at the outset such that the most uniform luminance possible is achieved amid low circuit complexity.

This object is achieved by a circuit arrangement having the features of patent claim 1.

The present disclosure is based on the insight that the circuit arrangement known from the prior art is accompanied by lighter and darker areas in a luminaire as a result of different average currents flowing through the series-connected LEDs of the different LED cascades. This disadvantage can admittedly be removed to a certain extent if the LEDs of the different cascades are mixed with one another or the LEDs adopt different distances from one another, in order to achieve the most uniform luminance possible. However, this results in a high level of layout complexity. In luminaries or LED modules in which optimized arrangement of the LEDs is not possible, let alone mixing thereof, operation of the circuit arrangement known from the prior art had been precluded hitherto. Similarly, in parts of the circuit, it was necessary to use more expensive LEDs that are designed for the maximum currents flowing. For reasons of cost, the LEDs that are suitable for the higher currents were installed only in the LED unit having the highest mean and hence also highest maximum current. In a circuit arrangement known from the prior art, it was therefore possible to use standard LEDs only if they were designed for the maximum current flowing. This results in undesirably high costs on account of overdimensioning in fewer than half of all LEDs in the circuit under consideration.

The present disclosure is based on the surprising insight that, despite the design, which is contrary from the outset to a uniform brightness distribution, of a circuit arrangement of the generic type according to DE 10 2013 201 439 A1, in which a sinusoidal profile of the current through the LED units, which corresponds to the mains voltage shape, appears and hence the current flowing through the respective LED cascade is severely dependent on the situation of the switched-on phase of the respective LED cascade within a mains half-cycle, it is possible to match the current in all cascades to one another, i.e. to set a largely identical mean value, with low circuit complexity if the respective switching-on times of the switching stages are altered in a suitable manner. The switching-on times are dependent on the voltage across the peak value detectors $C12$, $C22$ and $C32$. This voltage corresponds to the LED forward voltage or the voltage across the capacitors $C13$, $C23$ and $C33$. Accordingly, alteration of the switching-on times requires the voltage across the peak value detectors to be altered.

This is achieved according to the present disclosure by decoupling the cathode of at least the diodes $D12$, $D22$ from the negative connection of the relevant capacitor $C13$, $C23$ or from the output node $N12$ and $N22$ of the respective LED unit and by adding an appropriate voltage offset. Hence, across the peak value detector $C12$, for example, there is the voltage across the capacitor $C13$ plus an offset voltage. This voltage across the peak value detector $C12$ is used for the switching-on time. Consequently, the longest cascade now switches on only at a later time and less current flows through the LEDs in the longest cascade. If the middle LED unit is also adapted accordingly, it is possible for the switching-on times to be altered such that an approximately identical mean current flows in all LED cascades. An appropriate extension of the lowest LED unit is optional, since the lowest mean LED current flows in it anyway, i.e. adaptation is necessary particularly for the higher LED units.

Although the present disclosure is depicted in the present case using an exemplary embodiment having three LED units for the sake of better comprehensibility, it can naturally be applied to circuit arrangements having more or fewer LED units.

According to the present disclosure, there is therefore provision that in the LED units that are not the lowest LED unit, the fourth node is at any rate a node of the circuit arrangement that is at a lower potential, at least during a prescribable period during the operation of the circuit arrangement, than the respective output node or second node of the respective LED unit.

The effect achieved in this manner is that each LED of the circuit arrangement substantially carries a largely identical average current and therefore emits an almost identical amount of light. This allows annular, flat and linear modules to be produced. It simplifies LED selection significantly and also allows the use of less expensive LED types, particularly the same LED types in all LED units of a whole circuit under consideration.

A preferred embodiment is distinguished in that the circuit arrangement additionally includes a voltage divider that is coupled between the first and second input connections, wherein the voltage equalization series impedance is in the form of a linear controller, the tap of the voltage divider being coupled to the input of the linear controller.

As a preference, each LED unit additionally includes a second capacitor that is connected in parallel with the respective LED cascade. This measure supplies the respective LED cascade with power even in the phases in which the rectified mains AC voltage falls below the forward voltages of the LEDs of a respective cascade.

As a preference, the respective fourth node is at a lower potential than the respective second node at any rate when both the first and the second electronic switch of the respective LED unit are not on and hence across the second electronic switch there is at least one voltage that corresponds to the forward voltage of the cascade of LEDs that said LED unit includes. The effect achieved in this manner is that the peak value detector of the LED unit under consideration is always charged at least to its forward voltage, but augmented by a value that is obtained from the forward voltage of the LEDs of the LED unit situated beneath, which is weighted using the PWM-like switching-off pattern of the LED unit under consideration. In another embodiment, only fractions of the forward voltage of the LED unit situated beneath are used for weighting. In yet another embodiment, weighting occurs only when the first and second electronic switches of both the LED unit under consideration and the LED unit situated directly beneath are each not on. A combination of these two other embodiments is likewise possible.

To implement these measures, various approaches are conceivable: in the case of a first variant, the LED units that are not the lowest LED unit at any rate include a respective voltage divider that is coupled between two nodes of the next lowest LED unit, the fourth node being the tap of the respective voltage divider. In this context, the respective voltage divider may be in the form of a resistive voltage divider and may be connected in parallel with the respective LED cascade of the next lowest LED unit. The respective voltage divider may additionally be in the form of a resistive voltage divider and may be connected in parallel with the reference-ground electrode/main electrode path of the second electronic switch of the next lowest LED unit. Additionally, the respective voltage divider may be in the form of a resistive voltage divider and may be connected in parallel with the first capacitor of the next lowest LED unit. All of these variants, even in arbitrary combinations, allow a suitable shift in the potential that is present on the lower connection of the peak value detector in a negative direction, as planned.

As a preference, the respective voltage divider includes a first, higher and a second, lower nonreactive resistor. The first, higher resistor is respectively connected either to the reference-ground electrode of the second electronic switch or to the anode of the first LED of the cascade of the LED unit under consideration. However, the embodiment also includes the resistance value of the first nonreactive resistor being infinite, i.e. being produced by an open circuit. This results in a saving on components and also in an improvement in efficiency. The respective, aforementioned voltage divider may also be formed by the LEDs of the next lowest LED cascade itself, however. In this respect, the tap of the voltage divider, that is to say said fourth node of the LED unit under consideration, is coupled to a suitable point between two LEDs of the next lowest LED cascade. In this manner, the present disclosure can be implemented without additional components.

According to another implementation variant, the LED units that are not the lowest LED unit likewise include a respective nonreactive resistor whose first connection is coupled to the second input connection, the fourth node being the second connection of the respective nonreactive resistor. In a further variant, in the LED units that are not the lowest LED unit, the fourth node is at any rate coupled, advantageously via a nonreactive resistor, to the sixth node. In the case of these two variants too, the voltage present across the peak value detector can be modified in a desired manner.

As a preference, the DC voltage source can be implemented by virtue of the voltage that occurs on the second node of the lowest LED unit during operation of the circuit arrangement being used to produce a DC voltage, as is the case with the circuit arrangement known from the prior art in FIG. 1a. The DC voltage source advantageously includes a charge pump whose input is coupled to the second node of the lowest LED unit and whose output is coupled to the sixth node of all LED units.

It is even more advantageous, however, if the DC voltage source is implemented by virtue of the voltage that occurs on the first node of the lowest LED unit during operation of the circuit arrangement being used as the input of said charge pump. In this manner, an auxiliary voltage having a higher amplitude can be provided, so that, particularly during dimming operation, for example in the case of phase gating or chopping control, the provision of a sufficiently large auxiliary voltage on the sixth node is reliably made possible. This is the case particularly when the lowest LED unit has a buffer capacitor C33 that delivers power to the DC voltage source even at times of "dimmer blanking", that is to say even if the voltage across the voltage equalization series impedance has totally collapsed for a lack of input current. In this case, the voltage on the first node of the lowest LED unit is always higher than that on the sixth node, and the charging diode of the charge pump can be dropped and replaced by a short or a further nonreactive resistor.

As a preference, the LED units each include a different number of LEDs, advantageously each higher LED unit including twice the number of LEDs than the next lowest LED unit. This allows optimum utilization of the mains AC voltage and hence a particularly high level of efficiency.

Further advantageous embodiments will emerge from the dependent claims.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1a shows a schematic depiction of a circuit arrangement known from the prior art;

FIG. 1b shows the time profile of different voltages of the circuit arrangement from FIG. 1a;

FIG. 1c shows the time profile of different currents of the circuit arrangement from FIG. 1a;

FIG. 1d shows the time profile of further currents of the circuit arrangement from FIG. 1a;

FIG. 2b shows a schematic depiction of the time profile of different voltages of the circuit arrangement from FIG. 2a;

FIG. 2c shows a schematic depiction of the time profile of different currents of the circuit arrangement from FIG. 2a;

FIG. 2d shows a schematic depiction of the time profile of further currents of the circuit arrangement from FIG. 2a;

DETAILED DESCRIPTION

Figure 2A:
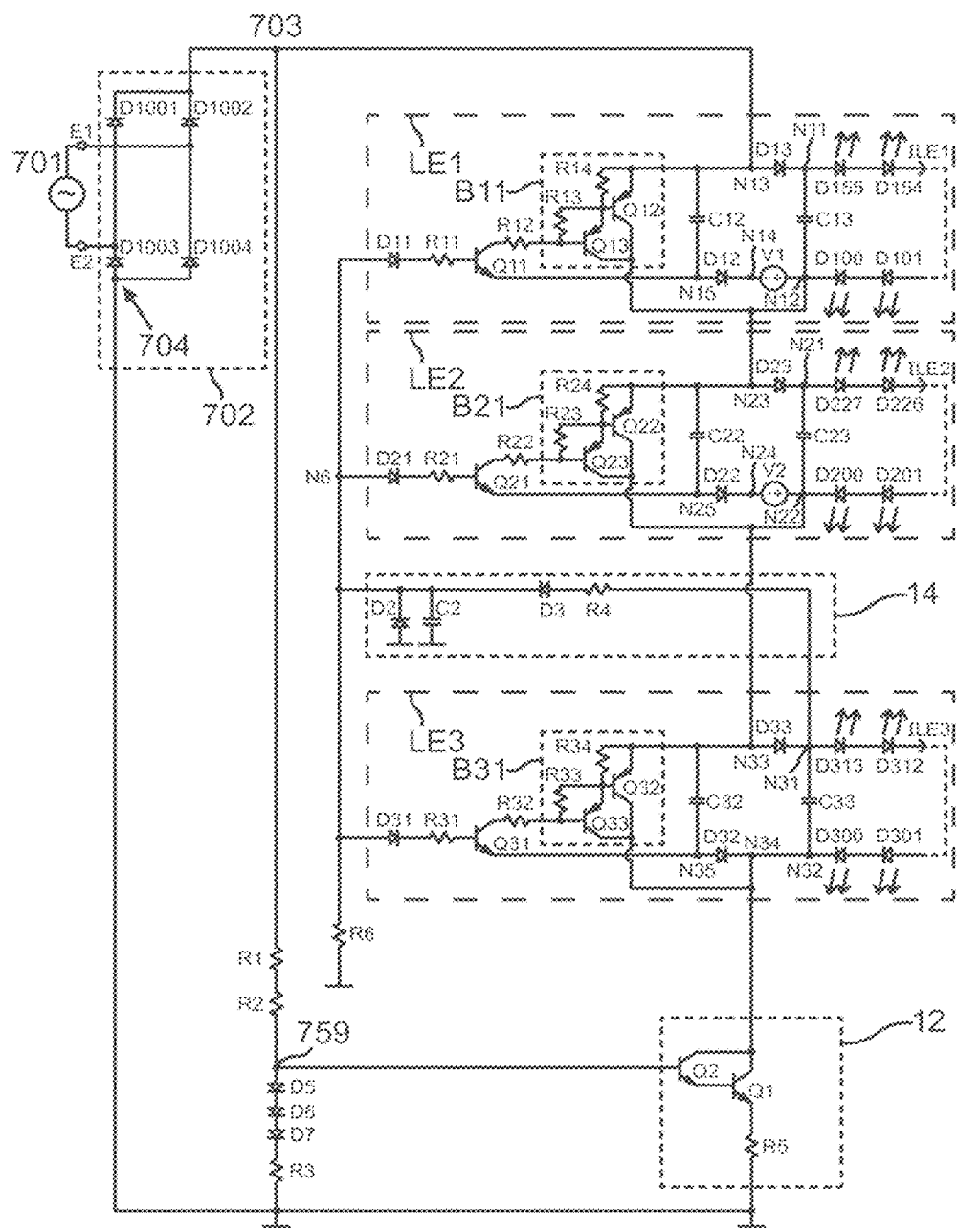
FIG. 2a shows a schematic depiction of a first embodiment of a circuit arrangement according to the various embodiments.

In the embodiments that follow, elements that are the same and elements that have the same effect are provided with the same reference symbols. For the sake of clarity, they are introduced only once.

The design and manner of operation of the circuit arrangement depicted in FIG. 1a and are known from the prior art has already been explained in detail further above. FIG. 1b shows the time profiles of the voltages on the nodes 703, N12, N22 and N32 for the circuit arrangement depicted in FIG. 1a. V(703) shows a mains half-cycle. As can be seen, at the time 0.5 ms, a voltage of 45V is reached, for example, and hence a voltage that is sufficient to supply the LEDs of the LED cascade LE3 and their optionally parallel-connected buffer capacitor C33 with power. From the dip in the time profile of the voltage V(N32), it is possible to identify the enabling of the third LED cascade LE3. When the mains voltage V(703) rises further, approximately 90V is reached at the time 1 ms, as a result of which a voltage is reached that is sufficient to supply the LED unit LE2 with power. This can be identified from the dip in the time profile of the voltage V(N22). Accordingly, the voltage V(N32) also falls to 0V again. At the time 1.3 ms, the voltage is sufficient for, in addition to the LED unit LE2, the LEDs of the LED unit LE3 to be supplied with power. Therefore, the voltage V(N32) collapses to 0V again at the time 1.3 ms. When the mains voltage V(703) rises further, approximately 180V is reached at the time 2 ms, this voltage being sufficient to supply the LEDs of the LED unit LE1 with power for the first time. Therefore, at the time 2 ms, both the voltages V(N12), V(N22) and V(N32) fall to 0V.

At the time 2.3 ms, the voltage is sufficient for, in addition to the LEDs of the LED unit LE1, the LEDs of the LED unit LE3 to be supplied with power, as can be seen from the collapse in the voltage V(N32). At the time 3 ms, the LEDs of the LED unit LE1 and LE2 are supplied with power. At the time 3.9 ms, the LEDs of the LED unit LE3 are added as well. After the peak value of the mains voltage half-cycle is exceeded, the LED cascades are connected in reverse order as in the first half of the mains half-cycle. At the time 9.5 ms, none of the LED units LE1, LE2, LE3 are now supplied with power.

FIG. 1c shows the time profiles of the currents I(LE1), I(LE2) and I(LE3) through the LEDs of the cascades of the relevant LED units, which each have buffer capacitors connected in parallel with them that feed the LEDs while the associated LED units are shorted externally. As can initially be seen, switching on the relevant LED cascade, that is to say enabling it by switching off the associated second electronic switch, results in a substantially continuous rise in the corresponding current up until the respective disconnection of the respective LED cascade by external shorting thereof by means of its associated second electronic switch. Subsequently, the current through the LEDs falls continuously again analogously to the energy decrease in the buffer capacitor feeding it. The LED cascade of the LED unit LE1 is accordingly switched on at approximately 2 ms (in this regard cf. also FIG. 1b) and is switched off at approximately 8 ms. The maximum current amplitude is approximately 120 mA. The LEDs of the LED cascade of the LED unit LE2 are operated at a maximum current of approximately 110 mA, while the LEDs of the LED unit LE3 are operated at a maximum current of approximately 80 mA. In this respect, very distinct differences arise in the current values, which go hand in hand with different brightnesses, temperatures, lifespans, etc. The amount of light emitted by a respective LED cascade is governed by the mean current flowing through it; as FIG. 1c clearly reveals, the mean values of the applicable currents differ distinctly from one another, resulting in similarly distinctly perceptible brightness differences.

FIG. 1d shows the time profiles of the currents I(D13), I(D23), I(D33) through the diodes D13, D23 and D33 of the circuit arrangement depicted in FIG. 1a. As can be seen, the current profiles depicted in FIG. 1d correspond to the voltage profiles that are depicted in FIG. 1b. In this respect, FIG. 1d very distinctly reveals when which LED units are supplied with power and when not. Whenever the flow of current is not equal to 0 mA, the respective LED unit is supplied with power.

FIG. 2a shows a first embodiment of a circuit arrangement according to the present disclosure in which, to alter the switching-on times of the LED cascades of the LED units LE1 and LE2, the nodes N14 and N12 have a voltage source V1 inserted between them and the nodes N24 and N22 have a voltage source V2 inserted between them, schematically to explain the principle on which the present disclosure is based. Although the insertion of explicit voltage sources would likewise solve the problem on which the present disclosure is based, in practice other implementations, which are discussed in more detail further below with reference to FIGS. 3 to 8, will be used instead for reasons of cost.

Nevertheless, the principle on which the present disclosure is based can be discussed very clearly with reference to FIG. 2a:

As already explained, the switching-on times of the respective LED cascades are dependent on the voltage across the peak value detectors C12, C22 and C32. In the prior art, this voltage corresponds to the LED forward voltage or the voltage across the buffer capacitors C13, C23 and C33. In order to shift the switching-on times in accordance with the present disclosure, the voltage across the peak value detectors C12, C22, C32 therefore needs to be altered in a suitable manner. This is made possible in the present case by decoupling of the cathodes D12, D22 from the negative connection of the relevant buffer capacitor C13, C23 and adding an appropriate voltage offset. In this case, it is necessary to be mindful of the polarity shown from the voltages V1 and V2:

A shift in any switching-on or enabling times forward in comparison with the prior art during a "rising quarter-cycle", e.g. for the lowest LED unit in order to increase current, makes no sense because such times would fall within ranges in which the instantaneous rectified mains voltage would not yet suffice for supplying power to the currently enabled LED unit.

The voltage equalization series impedance "would see" a negative voltage across itself, which in most cases would cause an extraordinarily undesirable interruption of current in the overall circuit, which not only can lead to flickering but can even cause the opposite of what is desired. Consequently, the only possible corrective remaining within a "rising quarter-cycle" is the shift in the switching-on times of the hitherto more heavily loaded LED units backward. The comparator transistor Q11, Q21 thus has to be deceived into seeing a higher voltage than actually corresponds to the forward voltage of the associated LED cascade so that the enable command is not provided until later than is actually necessary. Accordingly, the voltage dropped across the buffer capacitor C13 plus the offset voltage V1 is present across the capacitor C12, for example. Correspondingly, the voltage dropped across the buffer capacitor C23 plus the offset voltage V2 is present across the capacitor C22. The diodes D12 and D22 are necessary in order to decouple the capacitors C12 and C22 from the nodes N14 and N24, so that a negative voltage is also possible on the nodes N15 and N25, as is needed for the operation of the circuit arrangement. Additionally, it should be borne in mind that the DC voltage source 14 is now supplied with power from the node N31 and thereby ensures an adequate supply of power to the node N6 even in the case of phase-gating and phase-chopping dimming.

Figure 2C:
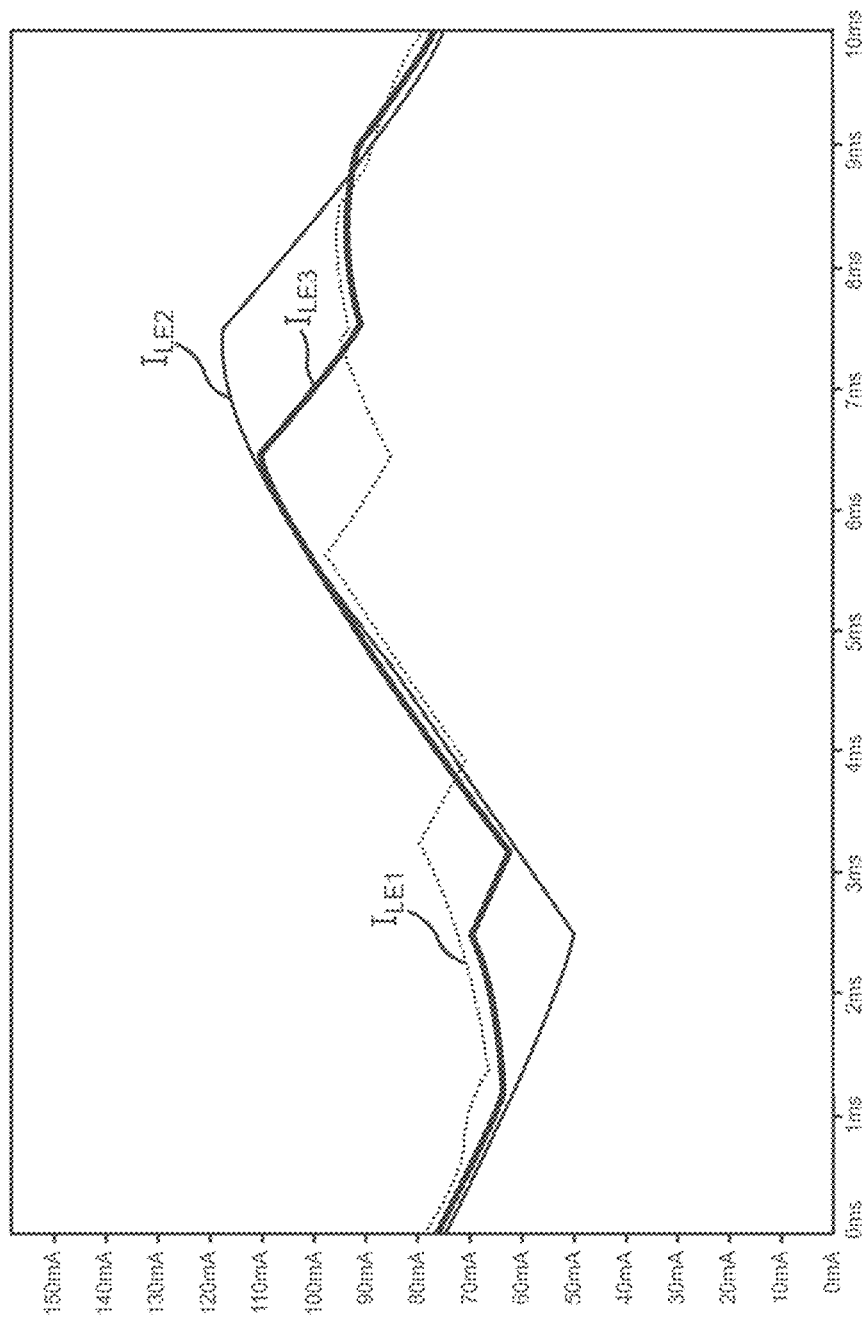
Figure 2D:
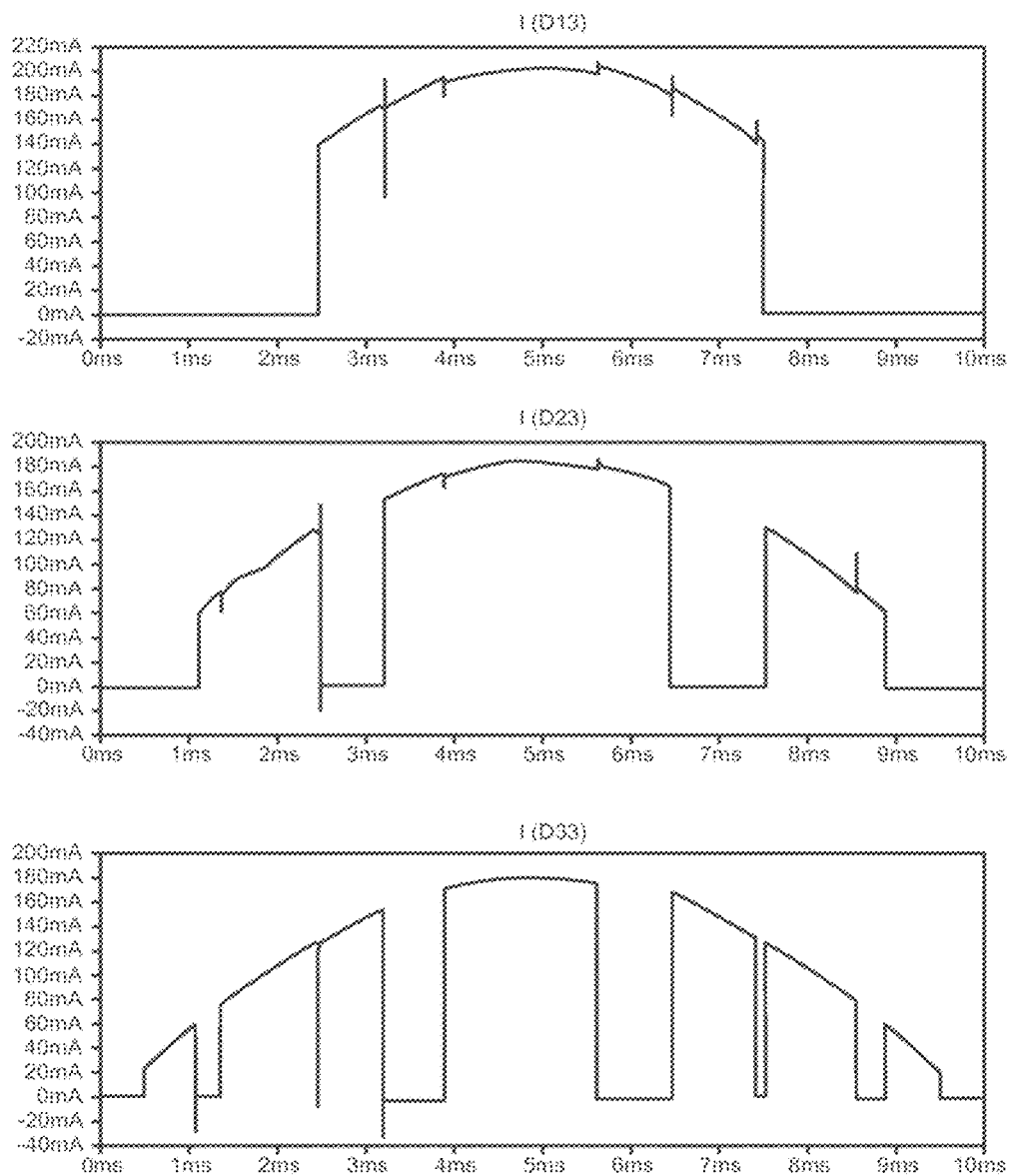

In the embodiment depicted and to ascertain the curve progressions, as are depicted in FIG. 2b to FIG. 2d, V1 has been chosen to be 29V and V2 has been chosen to be 8V.

As a comparison of FIG. 1b and FIG. 2b shows, the LED cascade LE1 now switches on at a later time (2.5 ms instead of 2 ms) and in fact switches off again at an earlier time (7.5 ms instead of 8 ms). The same also applies to the LED cascade LE2, which does not switch on for the first time until at approximately 1.2 ms (instead of 1 ms) and whose last switching-off process takes place at 8.8 ms (instead of 9 ms).

This results in the time profiles depicted in FIG. 2c for the currents I(LE1), I(LE2), I(LE3) through the LEDs of the cascades of the LED units LE1, LE2, LE3, smoothed by the associated buffer capacitors C13, C23 and C33.

As can be seen from the profiles in FIG. 2c and particularly from a comparison with FIG. 1c, the mean currents are at almost the same level. This results in the LEDs of the different LED units of a circuit according to the present disclosure substantially emitting light of the same brightness, and the current loading of the LEDs of the different LED units being almost identical. Additionally, it should be borne in mind that the peak current shown in FIG. 1c is almost 130 mA, while the peak current shown in FIG. 2c is below 120 mA. This means that cheaper LEDs can be used. If the same LEDs are used in a circuit arrangement according to the present disclosure as in the circuit arrangement known from the prior art, then they are subjected to distinctly lower loading, which results in a longer lifespan.

The comparison between FIG. 1d and FIG. 2d clearly illustrates that the LEDs of the LED unit LE1 are now supplied with power for a shorter period, whereas the temporal components of the supply of power to the LEDs of the LED units LE2 and LE3 have increased.

Figure 3:
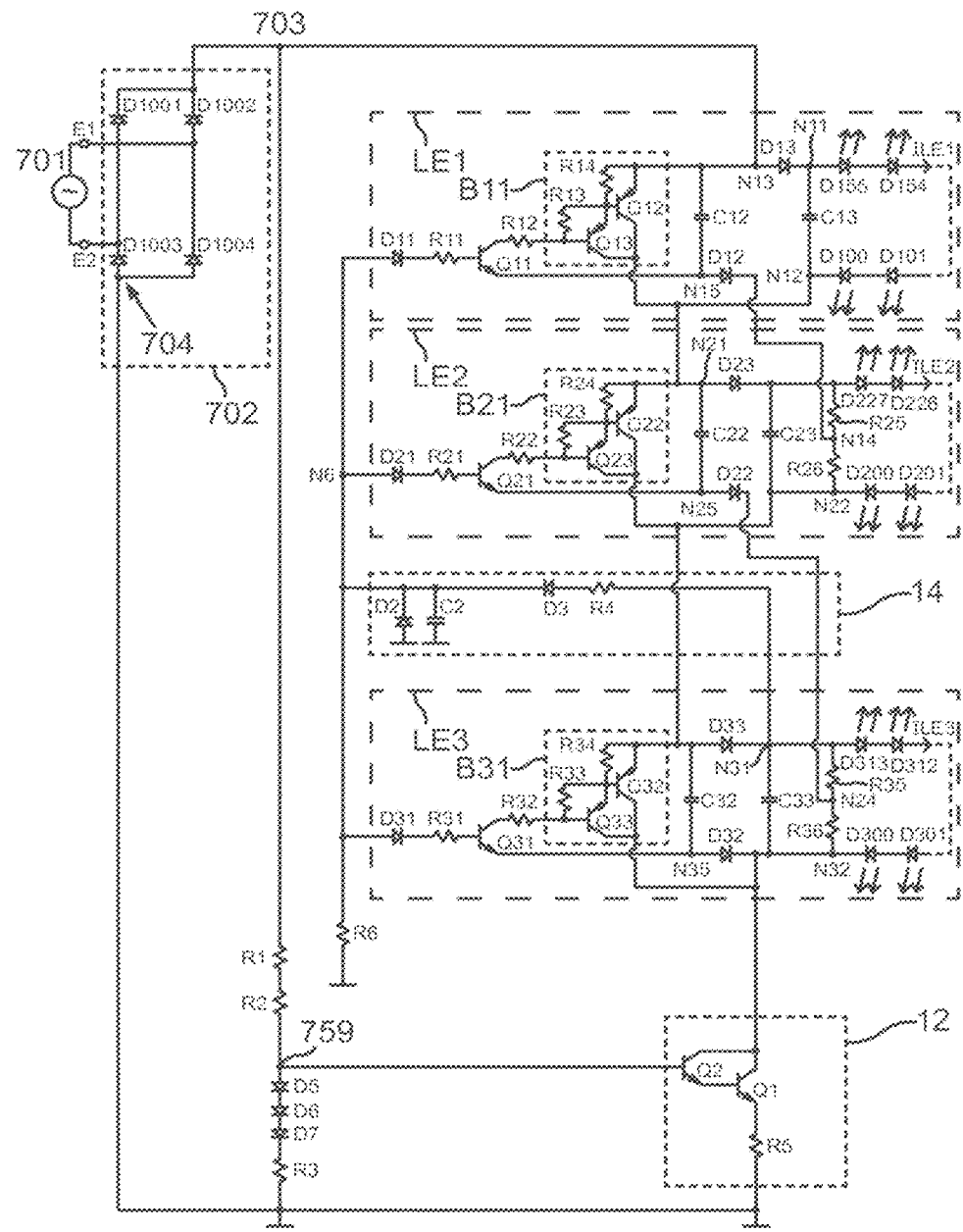
FIG. 3 shows a schematic depiction of a second embodiment of a circuit arrangement according to the various embodiments.

FIG. 3 shows a first implementation example. A first voltage divider that includes the nonreactive resistors R25 and R26 is connected in parallel with the LED cascade D200 to D227. The tap, which is accordingly the node N14, is connected to the cathode of the diode D12. Correspondingly, the LED unit LE3 has a resistive voltage divider provided in it that includes the nonreactive resistors R35 and R36 and is connected in parallel with the LED cascade that includes the LEDs D300 to D313. The tap, which is the node N24, is coupled to the cathode of the diode D22.

There is no provision for an offset voltage to be provided for the LED unit LE3 in the present case, since said LED unit, as the lowest LED unit, has the smallest LED current anyway, and in this respect a further reduction for alignment with the currents of the other LED units makes no sense. Optionally, this can naturally occur, however. It is rather desirable to even increase the current loading of the lower LED units, however, which, as can be seen from the comparison of FIG. 1c-FIG. 2c and FIG. 2c-FIG. 2d, is even successful.

It should be noted that the LEDs continue—uninfluenced by the measures according to the present disclosure—to still be supplied with the original voltage, as in the case of the circuit arrangement depicted in FIG. 1a, on the basis of the voltage stored in the respective buffer capacitors C13, C23, C33. Only the voltage stored in the peak value detectors is varied by the offset voltages that are present.

Figure 4A:
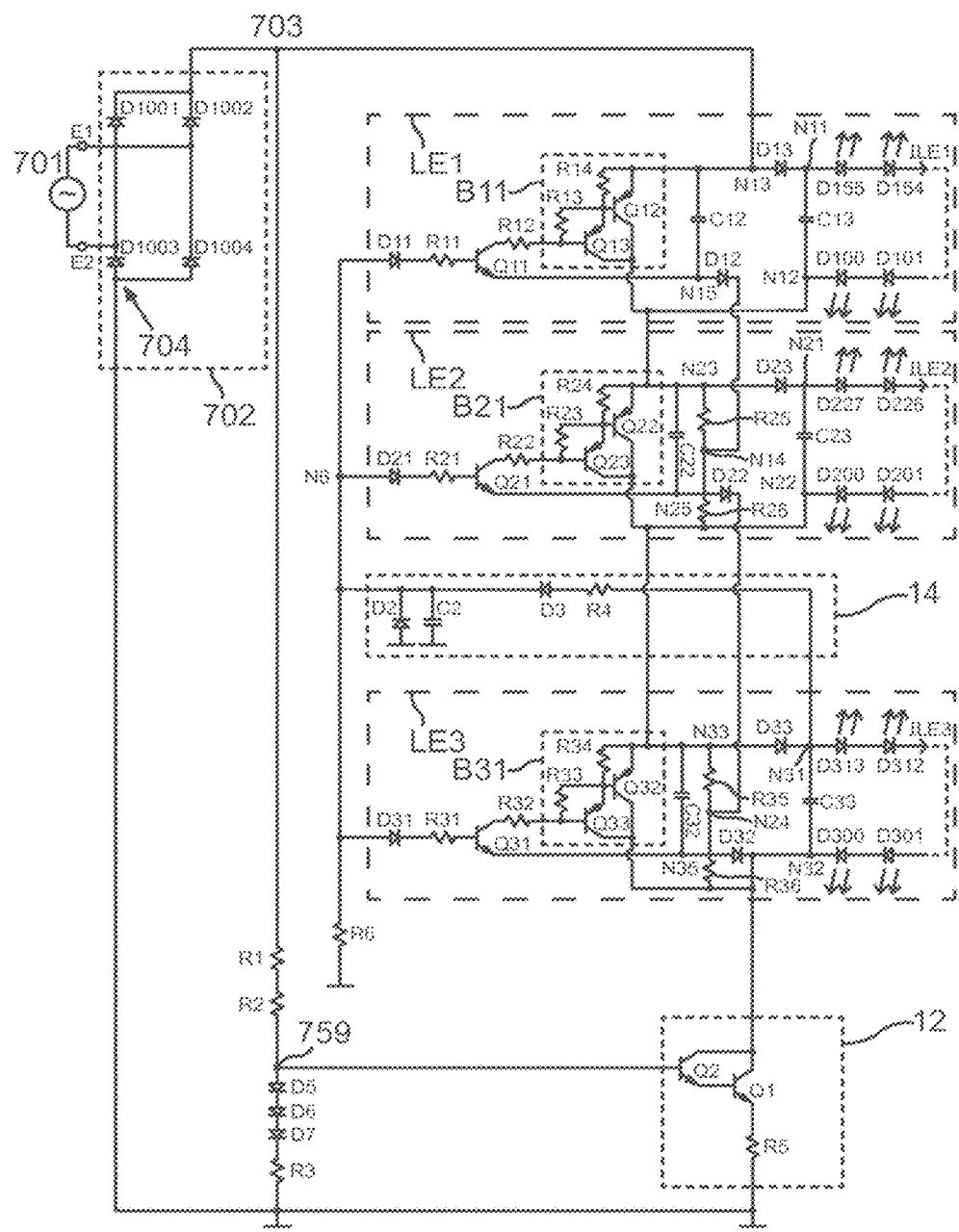
FIG. 4 shows a schematic depiction of a third embodiment of a circuit arrangement according to the various embodiments.

In the case of the embodiment depicted in FIG. 4a, the respective resistive voltage dividers are connected in parallel with the reference-ground electrode/main electrode path of the respective second electronic switch B21 or B31, the respective tap N14 or N24 of the respective voltage divider again being coupled to the cathode of the relevant diode D12 or D22.

Figure 4B:
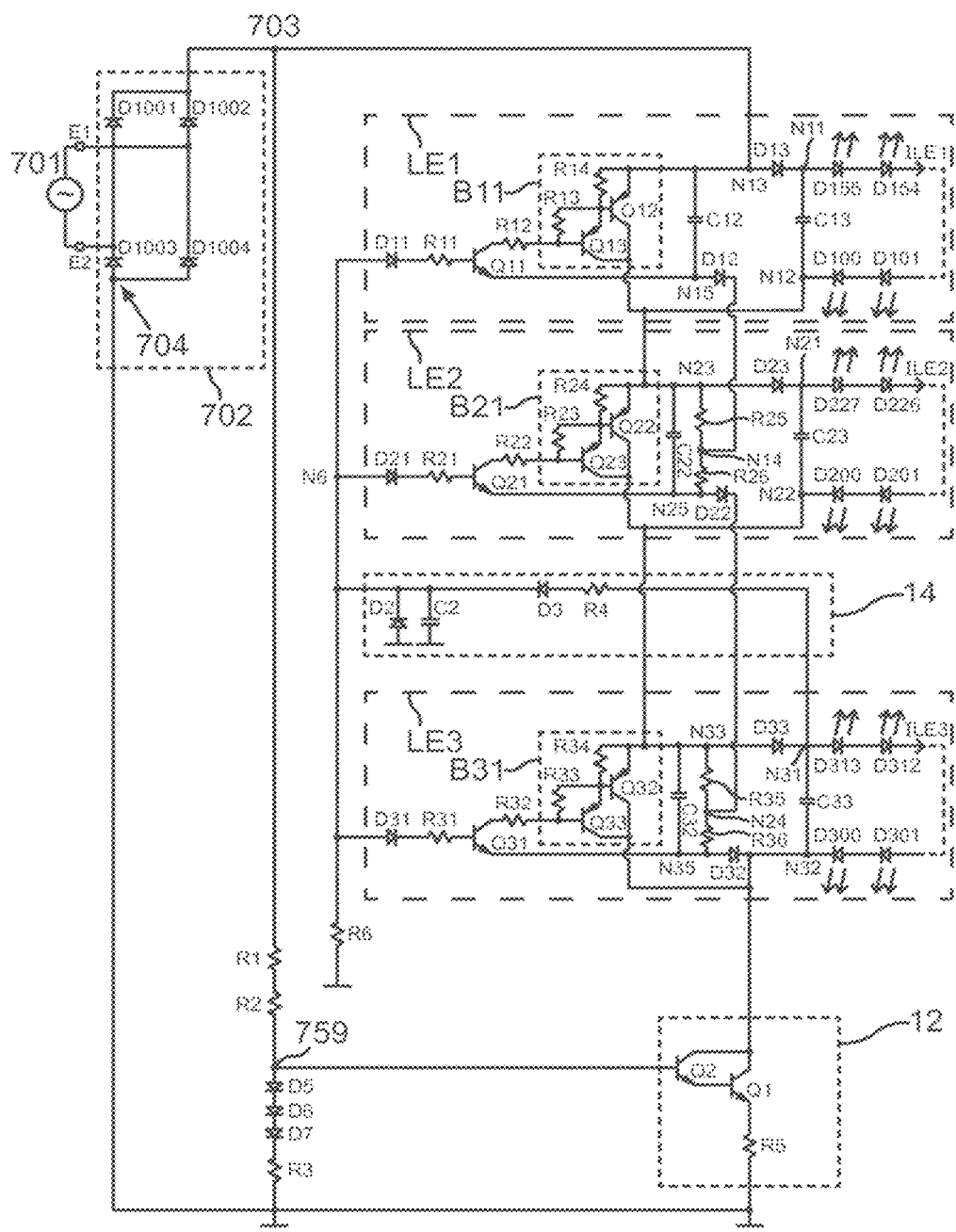

In the case of the embodiment depicted in FIG. 4b, the respective resistive voltage dividers are connected in parallel with the path between the reference-ground electrodes of the two electronic switches of the LED unit under consideration, or, to put it more simply, with the first capacitor of the same LED unit, the respective tap N14 or N24 of the respective voltage divider again being coupled to the cathode of the relevant diode D12 or D22.

Figure 5:
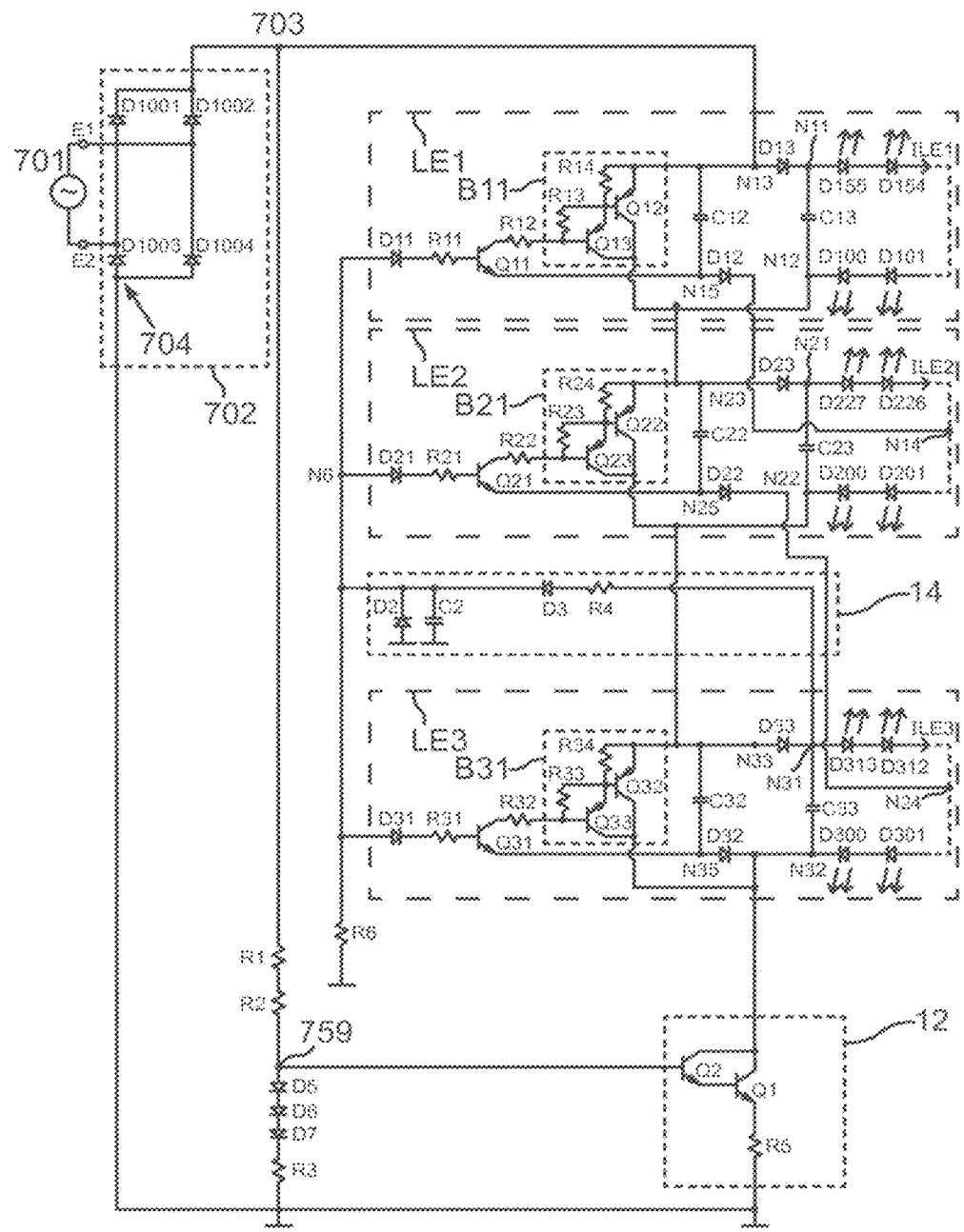
FIG. 5 shows a schematic depiction of a fourth embodiment of a circuit arrangement according to the various embodiments.

In the case of the embodiment depicted in FIG. 5, a respective voltage divider is formed by the LEDs of the next lowest LED cascade. In this respect, the cathode of the diode D12, i.e. the node N14, is coupled to a coupling point that lies between two LEDs of the LED cascade of the LED unit LE2 that includes the LEDs D200 to D227. Correspondingly, the cathode of the diode D22, the node N24, is coupled to a coupling point between the LEDs D300 to D313 of the LED cascade of the LED unit LE3.

In an embodiment that is not depicted, the respective voltage divider can also include two zener diodes instead of the two resistors or the LEDs, in order thereby to set the voltage offset. In the case of the resistive voltage dividers introduced above, particularly the lower nonreactive resistor R26, R36 may be replaced by a zener diode in the breakdown direction.

Figure 6:
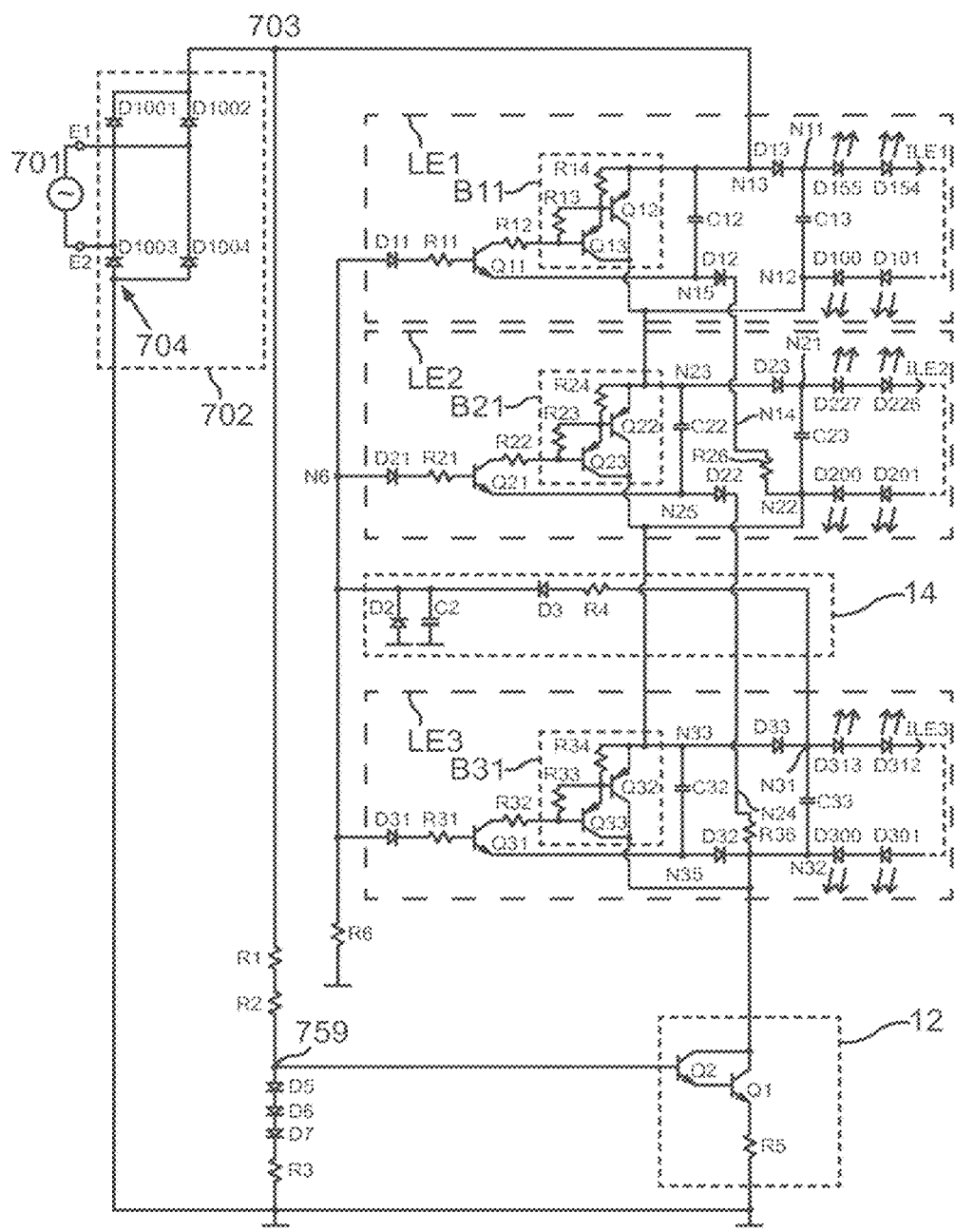
FIG. 6 shows a schematic depiction of a fifth embodiment of a circuit arrangement according to the various embodiments.

The embodiment depicted in FIG. 6 substantially corresponds to the embodiment depicted in FIG. 3 or in FIG. 4a, but with the higher resistors R25, R35 of the two resistive voltage dividers assuming the value infinity, i.e. being replaced by open circuits.

Figure 7:
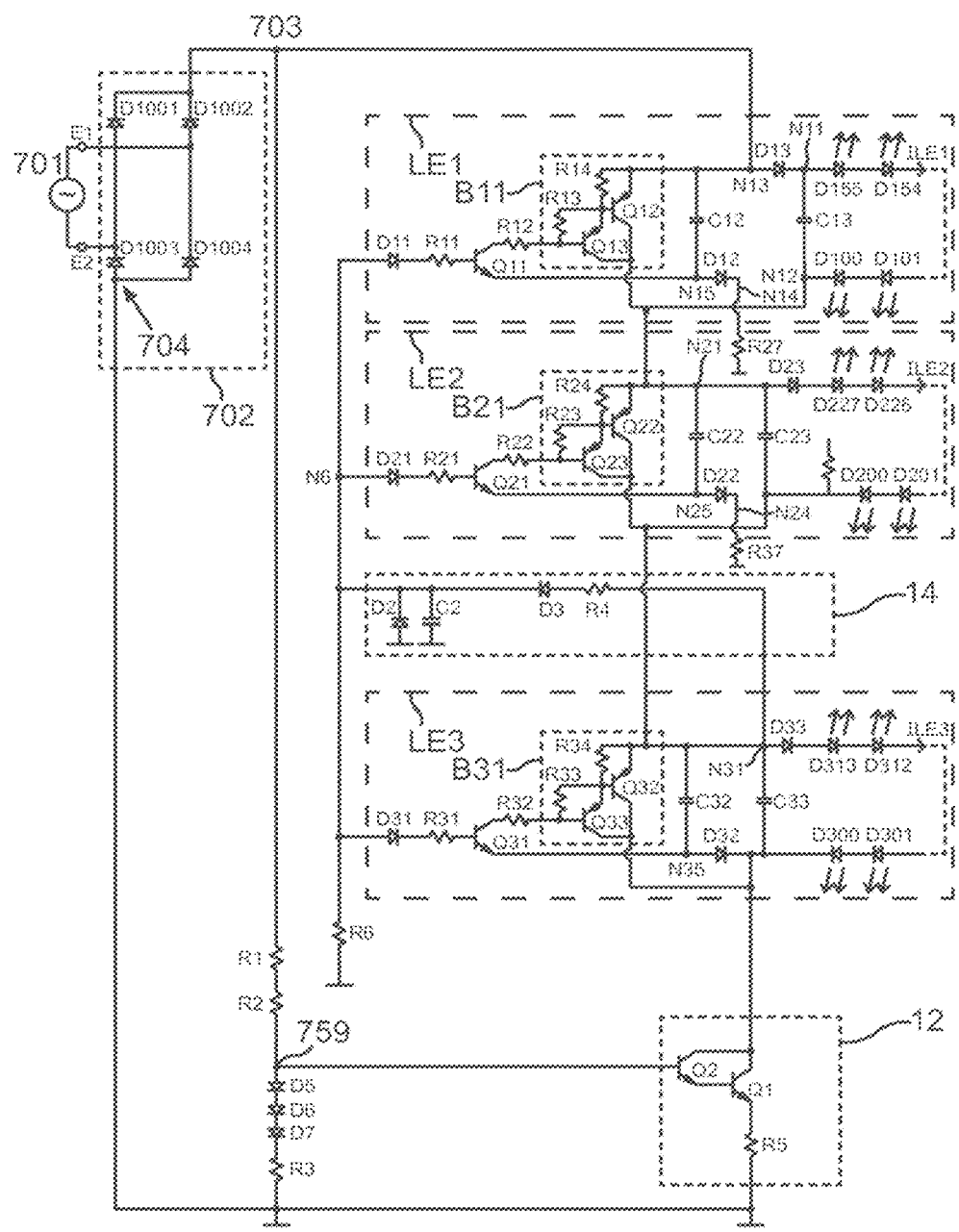
FIG. 7 shows a schematic depiction of a sixth embodiment of a circuit arrangement according to the various embodiments.

In the case of the embodiment depicted in FIG. 7, the cathode of the diode D12, i.e. the node N14, is coupled to the reference-ground potential, i.e. the potential on the node 704, via a nonreactive resistor R27, whereas the diode D22 has its cathode, i.e. the node N24, coupled to the reference-ground potential via a nonreactive resistor R37.

Figure 8:
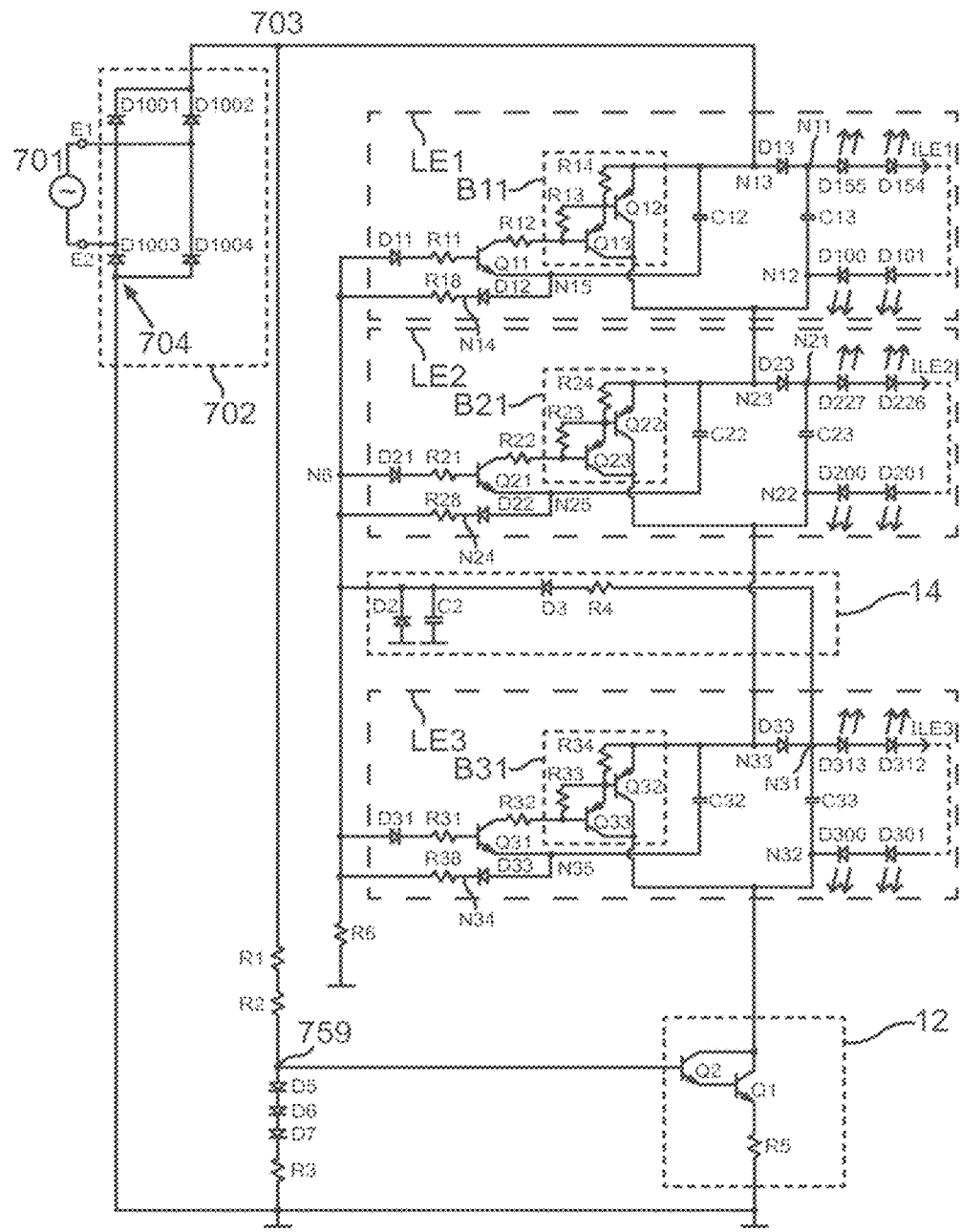
FIG. 8 shows a schematic depiction of a seventh embodiment of a circuit arrangement according to the various embodiments.

In the case of the embodiment depicted in FIG. 8, the cathode of the diode D12, i.e. the node N14, is coupled to the sixth node N6 via a nonreactive resistor R18. The same applies to the LED unit LE2, in which the cathode of the diode D22, the node N24, is coupled to the sixth node N6 via a nonreactive resistor R28. In the case of the embodiment depicted in FIG. 8, the resistors R18 and R28 are used to supply such a considerable amount of current to the sixth node N6 that it would even be possible to dispense, at that point, with the DC voltage source for producing the reference voltage. This results in a simpler layout for the circuit arrangement and in a further cost saving, since this implementation requires fewer components.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A circuit arrangement for operating at least a first and a second cascade of LEDs comprising:
   an input having a first and a second input connection for coupling to a rectified AC supply voltage;
   a voltage equalization series impedance; and
   at least a first higher and a second lower LED unit, wherein the first LED unit comprises the first cascade of LEDs and the second LED unit comprises the second cascade of LEDs;
   wherein each LED unit further comprises:
      a first diode coupled in series with the respective LED cascade, wherein the coupling point between the first diode and the respective LED cascade is a first node, wherein that connection of the LED cascade that is not coupled to the first diode is a second node, wherein that connection of the first diode that is not coupled to the LED cascade is a third node;
      the series connection of a first capacitor and a second diode, which is coupled between the third node and a fourth node of the circuit arrangement, wherein the coupling point between the first capacitor and the second diode is a fifth node, the anode of the second diode being coupled to the fifth node; and
      a first and a second electronic switch each having a control electrode, a reference-ground electrode and a main electrode, wherein the control electrode of the first electronic switch is coupled to a sixth node, wherein the reference-ground electrode of the first electronic switch is coupled to the fifth node, wherein the main electrode of the first electronic switch is coupled to the control electrode of the second electronic switch, wherein the reference-ground electrode of the second electronic switch is coupled to the third node, wherein the main electrode of the second electronic switch is coupled to the second node;

wherein the third node of the highest LED unit is coupled to the first input connection, wherein the second node of the lowest LED unit is coupled to the voltage equalization series impedance such that the voltage equalization series impedance is coupled in series between the second node of the lowest LED unit and the second input connection;

wherein the third node of a respective LED unit that is not the highest LED unit is coupled to the second node of the next highest LED unit;

wherein the sixth nodes of all LED units are coupled to a DC voltage source;

wherein in the LED units that are not the lowest LED unit, the fourth node is at any rate a node of the circuit arrangement that is at a lower potential, at least during a prescribable period during the operation of the circuit arrangement, than the respective second node of the respective LED unit.

2. The circuit arrangement as claimed in claim 1, further comprising a voltage divider that is coupled between the first and second input connections, wherein the voltage equalization series impedance is in the form of a linear controller, a tap of the voltage divider being coupled to the input of the linear controller.

3. The circuit arrangement as claimed in claim 2, wherein each LED unit further comprises a second capacitor that is connected in parallel with the respective LED cascade.

4. The circuit arrangement as claimed in claim 3, wherein the respective fourth node is at a lower potential than the respective second node at any rate when both the first and the second electronic switch of the respective LED unit are not on and hence across the second electronic switch of this LED unit there is at least one voltage that corresponds to the forward voltage of the cascade of LEDs that said LED unit comprises.

5. The circuit arrangement as claimed in claim 4, wherein the LED units that are not the lowest LED unit at any rate comprise a respective voltage divider that is coupled between two nodes of a next lowest LED unit, the fourth node being the tap of the respective voltage divider.

6. The circuit arrangement as claimed in claim 5, wherein the respective voltage divider is in the form of a resistive voltage divider and the respective second capacitor has the next lowest LED unit connected in parallel with it.

7. The circuit arrangement as claimed in claim 5, wherein the respective voltage divider is in the form of a resistive voltage divider and the reference-ground electrode/main electrode path of the second electronic switch has the next lowest LED unit connected in parallel with it.

8. The circuit arrangement as claimed in claim 5, wherein the respective voltage divider is in the form of a resistive voltage divider and the first capacitor has the next lowest LED unit connected in parallel with it.

9. The circuit arrangement as claimed in claim 5, wherein the respective voltage divider comprises a first higher and a second lower nonreactive resistor, the resistance value of the first nonreactive resistor being infinite.

10. The circuit arrangement as claimed in claim 5, wherein the respective voltage divider is formed by the LEDs of the next lowest LED cascade in the form that the tap of said voltage divider, the respective fourth node, is coupled to a suitable node between two LEDs of the next lowest LED cascade.

11. The circuit arrangement as claimed in claim 5, wherein the LED units each comprise a different number of LEDs.

12. The circuit arrangement as claimed in claim 11, wherein each higher LED unit comprises twice the number of LEDs than the next lowest LED unit.

13. The circuit arrangement as claimed in claim 1, wherein the LED units that are not the lowest LED unit at any rate comprise a respective nonreactive resistor whose first connection is coupled to the second input connection, the fourth node being the second connection of the respective nonreactive resistor.

14. The circuit arrangement as claimed in claim 1, wherein in the LED units that are not the lowest LED unit, the fourth node is at any rate coupled to the sixth node.

15. The circuit arrangement as claimed in claim 1, wherein the DC voltage source is implemented by virtue of the voltage that occurs on the first or on the second node of the lowest LED unit during operation of the circuit arrangement being used to produce a DC voltage.

16. The circuit arrangement as claimed in claim 15, wherein the DC voltage source comprises a charge pump whose input is coupled to the first or to the second node of the lowest LED unit and whose output is coupled to the sixth node of all LED units.

17. The circuit arrangement as claimed in claim 1, wherein in the LED units that are not the lowest LED unit, the fourth node is at any rate coupled to the sixth node via a nonreactive resistor.

* * * * *